United States Patent
Matsueda

(10) Patent No.: US 7,821,662 B2
(45) Date of Patent: Oct. 26, 2010

(54) INFORMATION PROCESSING APPARATUS AND JOB PROCESSING APPARATUS

(75) Inventor: Kazutaka Matsueda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 972 days.

(21) Appl. No.: 11/637,075

(22) Filed: Dec. 12, 2006

(65) Prior Publication Data

US 2007/0133047 A1      Jun. 14, 2007

(30) Foreign Application Priority Data

Dec. 13, 2005   (JP)   .............................. 2005-359532

(51) Int. Cl.
    *G06F 3/12*   (2006.01)
(52) U.S. Cl. ................... 358/1.15; 358/1.13; 358/1.14; 718/102; 718/103; 718/104; 718/105; 718/106
(58) Field of Classification Search ....... 358/1.13–1.17; 700/99–103; 718/102–106
    See application file for complete search history.

(56) References Cited

U.S. PATENT DOCUMENTS

| 6,985,243 | B1 | 1/2006 | Matsueda |
| 7,239,410 | B2 | 7/2007 | Matsueda |
| 7,242,488 | B2 | 7/2007 | Matsueda |
| 7,256,907 | B2 | 8/2007 | Matsueda |
| 7,528,978 | B2 * | 5/2009 | Randt ........................ 358/1.15 |
| 2003/0179404 | A1 | 9/2003 | Matsueda |
| 2004/0064786 | A1 | 4/2004 | Ikeda et al. |
| 2004/0193465 | A1 * | 9/2004 | Sangroniz et al. .............. 705/8 |
| 2004/0196470 | A1 * | 10/2004 | Christiansen ............... 358/1.1 |
| 2005/0206913 | A1 | 9/2005 | Matsuda et al. |
| 2005/0275882 | A1 * | 12/2005 | Yasuda et al. .............. 358/1.15 |
| 2007/0133047 | A1 | 6/2007 | Matsueda |
| 2007/0136117 | A1 | 6/2007 | Matsueda |

FOREIGN PATENT DOCUMENTS

| JP | 2004164570 | 6/2004 |
| JP | 2005295515 A | 10/2005 |

* cited by examiner

*Primary Examiner*—Chan S Park
(74) *Attorney, Agent, or Firm*—Fitzpatrick, Cella, Harper & Scinto

(57) ABSTRACT

Job processing apparatus of the present invention comprises a reception unit adapted to receive a job ticket; a recognition unit adapted to recognize a processing content of a processing step of interest defined in the job ticket; a detection unit adapted to detect a processing status of the process; an identification adapted to identify a processed part of a print job and an unprocessed part of the print job based on the processing status, when the processing status satisfies a job ticket dividing condition; a job ticket generation unit adapted to generate a first job ticket that describes a processing parameter of the processed part for a next step, in order to process the processed part in the next step; and a delivery unit adapted to deliver the first job ticket to a device which executes processing in the next step.

24 Claims, 27 Drawing Sheets

| | | |
|---|---|---|
| 301 | JOBTICKET | |
| 302 | #---361212 | |
| 303 | JobName | 361212 |
| 304 | CLIENT | kazuta |
| 305 | PAYER | matsueda |
| 306 | DESTINATION | xxxxxx-yyyyyy |
| 307 | Server | stargate |
| 308 | START DATE & TIME | 2005/04/14  19:00:01 JST |
| 309 | STEP A1: DOCUMENT ENTRY APPLICATION | |
| 310 | STEP A2: IMPOSITION APPLICATION | |
| 311 | STEP A3: ENGINE | |
| 312 | STEP A4: FINISHER | |
| 313 | STEP A5: CONFIRMATION | |
| 314 | JobEnd | 361212 |

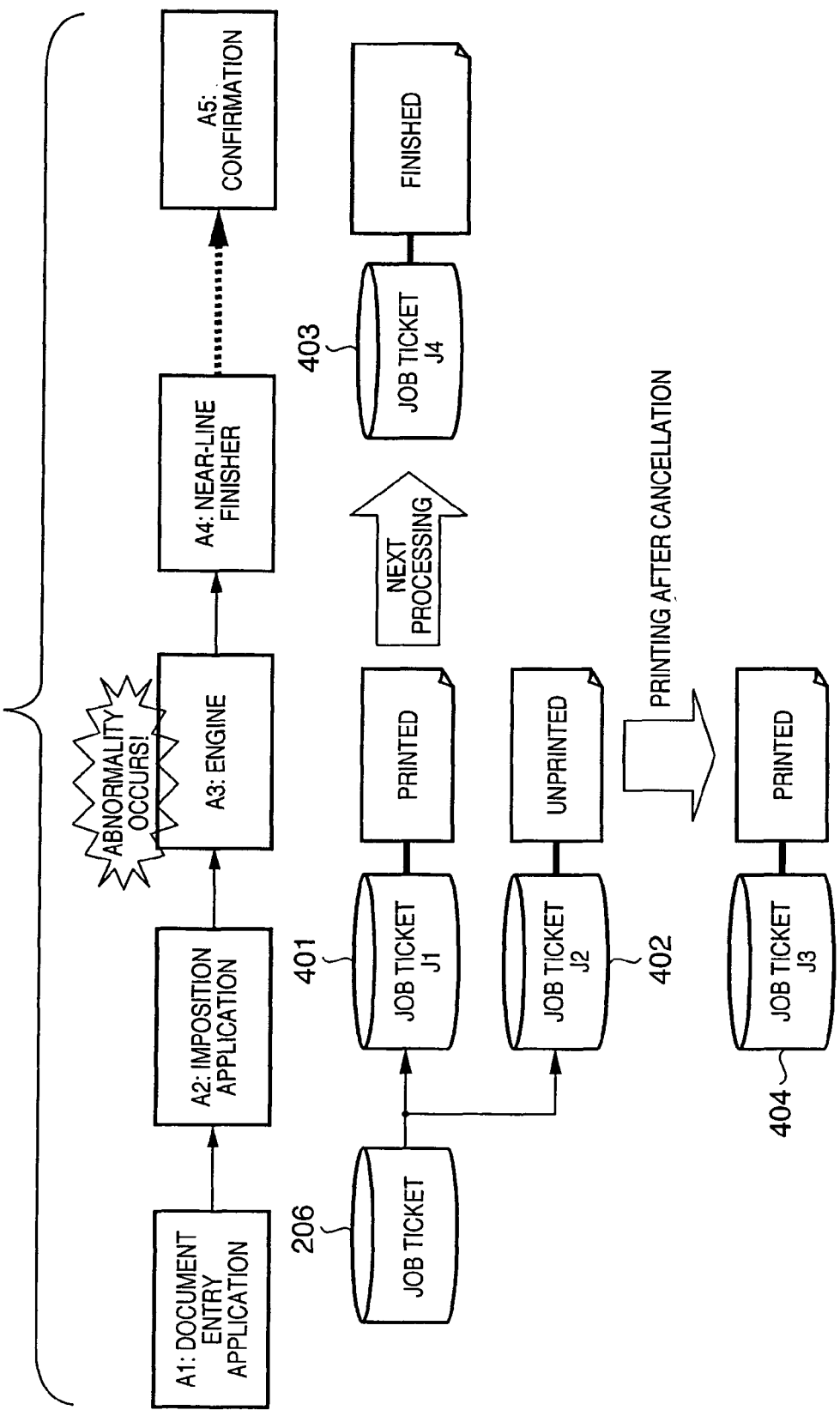

```
JOBTICKET
---361212
```

501 — JobName        361212-1-2-3-1/2

CLIENT           kazuta
PAYER            matsueda
DESTINATION      xxxxxx-yyyyyy Server                   stargate
START DATE & TIME        2005/04/14  19:00:01 JST 502:
STEP A1: DOCUMENT ENTRY APPLICATION
        <PROCESSING EXECUTANT>  System
        <ENTRY FILE NAME>       aaabbbccc.pdf
        <FINE SIZE>             52MByte
        <HOT FOLDER>            folder1
        <NUMBER OF COPIES>,     10 COPIES
        <START TIME>            2005/04/14 19:00:01
        <END TIME>              2005/04/14 19:00:03

503:
STEP A2: IMPOSITION APPLICATION
        <PROCESSING EXECUTANT>   yamanaka
        <IMPOSITION>       A3 1up  DOUBLE-SIDED  WRAPPING BINDING
        <COVER>                          ONE THICK SHEET
        <NUMBER OF OUTPUT COPIES>  10 COPIES
        <NUMBER OF PRINT SHEETS>   120 SHEETS 504:
STEP A3: ENGINE
        <DEVICE NAME>      ABCD
505 — <OUTPUT PAGES>        3-1/2  50 PAGES
506 — <TALLY PASSWORD>      a3$DtGh)
        <UNOUTPUT JOB>     3-2/2  70 PAGES 507 — STEP A4: FINISHER
508 — STEP A5: CONFIRMATION
509 — JobEnd         361212-1-2-3-1/2

```
JOBTICKET
---361212
```
601 — JobName          361212-1-2-3-2/2

CLIENT           kazuta
PAYER            matsueda
DESTINATION      xxxxxx-yyyyyy Server                   stargate
START DATE & TIME    2005/04/14  19:00:01 JST STEP A1: DOCUMENT ENTRY APPLICATION
    <PROCESSING EXECUTANT>  System
    <ENTRY FILE NAME>       aaabbbccc.pdf
    <FINE SIZE>             52MByte
    <HOT FOLDER>            folder1
    <NUMBER OF COPIES>,     10 COPIES
    <START TIME>            2005/04/14 19:00:01
    <END TIME>              2005/04/14 19:00:03

STEP A2: IMPOSITION APPLICATION
    <PROCESSING EXECUTANT>   yamanaka
    <IMPOSITION>      A3 1up  DOUBLE-SIDED  WRAPPING BINDING
    <COVER>                          ONE THICK SHEET
    <NUMBER OF OUTPUT COPIES>  10 COPIES
    <NUMBER OF PRINT SHEETS>   120 SHEETS STEP A3: ENGINE
    <DEVICE NAME>       ABCD
    <OUTPUT PAGES>      3-1/2  50 PAGES
602 — <TALLY PASSWORD>    a3$DtGh)
    <UNOUTPUT JOB>      3-2/2  70 PAGES
STEP A4: FINISHER
STEP A5: CONFIRMATION 603 — JobEnd          361212-1-2-3-2/2

FIG. 8A

```
JOBTICKET
---361212
JobName          361212-1-2-3-1/2-4-2/2

~~~~~~~~~~~~~~~~~~~~~~~~~~~~~
~~~~~~~~~~~~~~~~~~~~~~~~~~~~~

STEP A3: ENGINE
       <DEVICE NAME>        ABCD
       <OUTPUT PAGES>       3-1/2  50 PAGES
       <TALLY PASSWORD>     a3$DtGh)
       <UNOUTPUT JOB>       3-2/2  70 PAGES
STEP A4: FINISHER
       <DEVICE NAME>        NearLine Finisher BB
       <PROCESSING PAGES>   4-1/2  48 PAGES
       <TALLY PASSWORD>     44ppp4444m
       <UNPROCESSED JOB>    4-2/2   2 PAGES

STEP A5: CONFIRMATION

JobEnd           361212-1-2-3-1/2-4-2/2
```

```
JOBTICKET
---361212
JobName          361212-1-2-3-2/2
~~~~~~~~~~~~~~~~~~~~~~~~~~~~~~~~
~~~~~~~~~~~~~~~~~~~~~~~~~~~~~~~~

STEP A3: ENGINE
        <DEVICE NAME>       ABCD
        <OUTPUT PAGES>      3-1/2  50 PAGES
        <TALLY PASSWORD>    a3$DtGh)
        <OUTPUT PAGES>      3-2/2  70 PAGES
STEP A4: FINISHER
        <DEVICE NAME>       NearLine Finisher BB
        <PROCESSING PAGES>  70 PAGES

STEP A5: CONFIRMATION
```

```
JOBTICKET
---361212
JobName        361212-1-2-3-1/2-4-2/2
902 → SubJobName     361212-1-2-3-2/2
~~~~~~~~~~~~~~~~~~~~~~~~~~~~~~~~~
~~~~~~~~~~~~~~~~~~~~~~~~~~~~~~~~~

STEP A3: ENGINE
        <DEVICE NAME>      ABCD
        <OUTPUT PAGES>     3-1/2  50 PAGES
        <TALLY PASSWORD>   a3$DtGh)
        <UNOUTPUT JOB>     3-2/2  70 PAGES
STEP A4: FINISHER
        <DEVICE NAME>      NearLine Finisher BB
        <PROCESSING PAGES> 72 PAGES

STEP A5: CONFIRMATION

JobEnd         361212-1-2-3-1/2-4-2/2
```

901

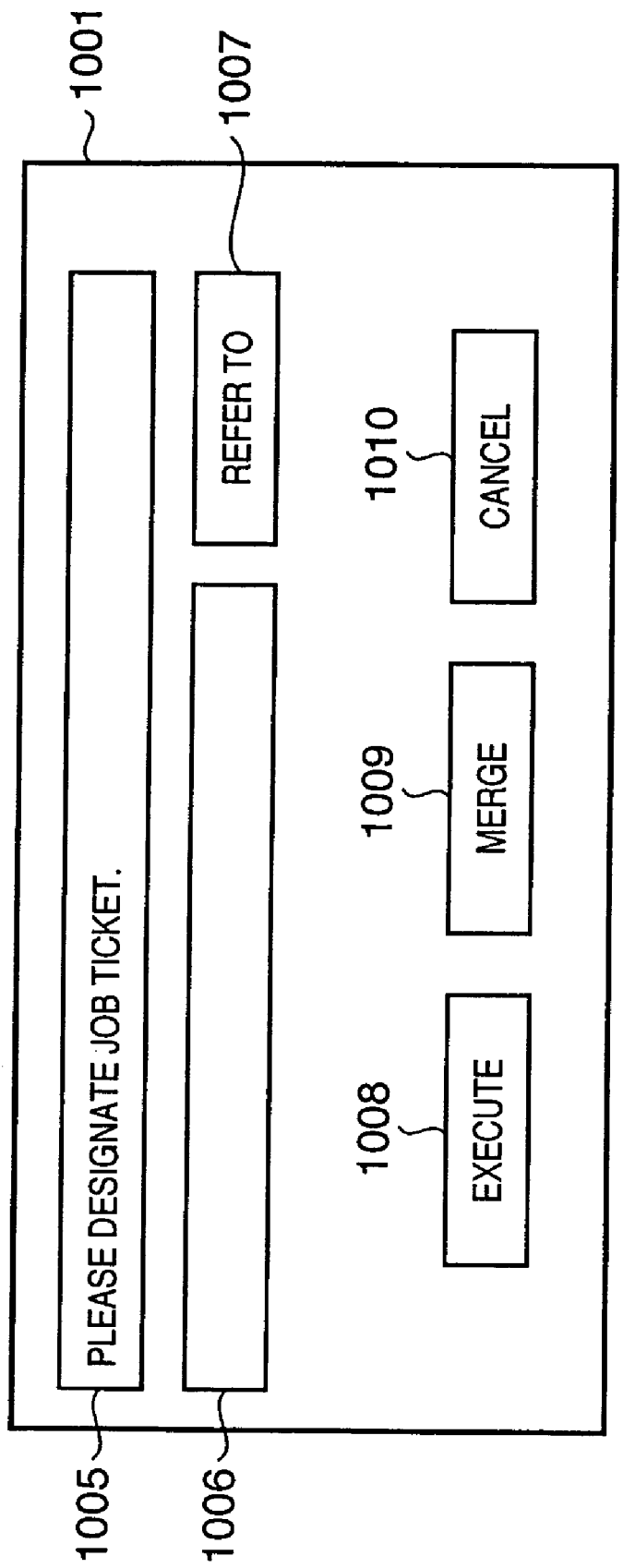

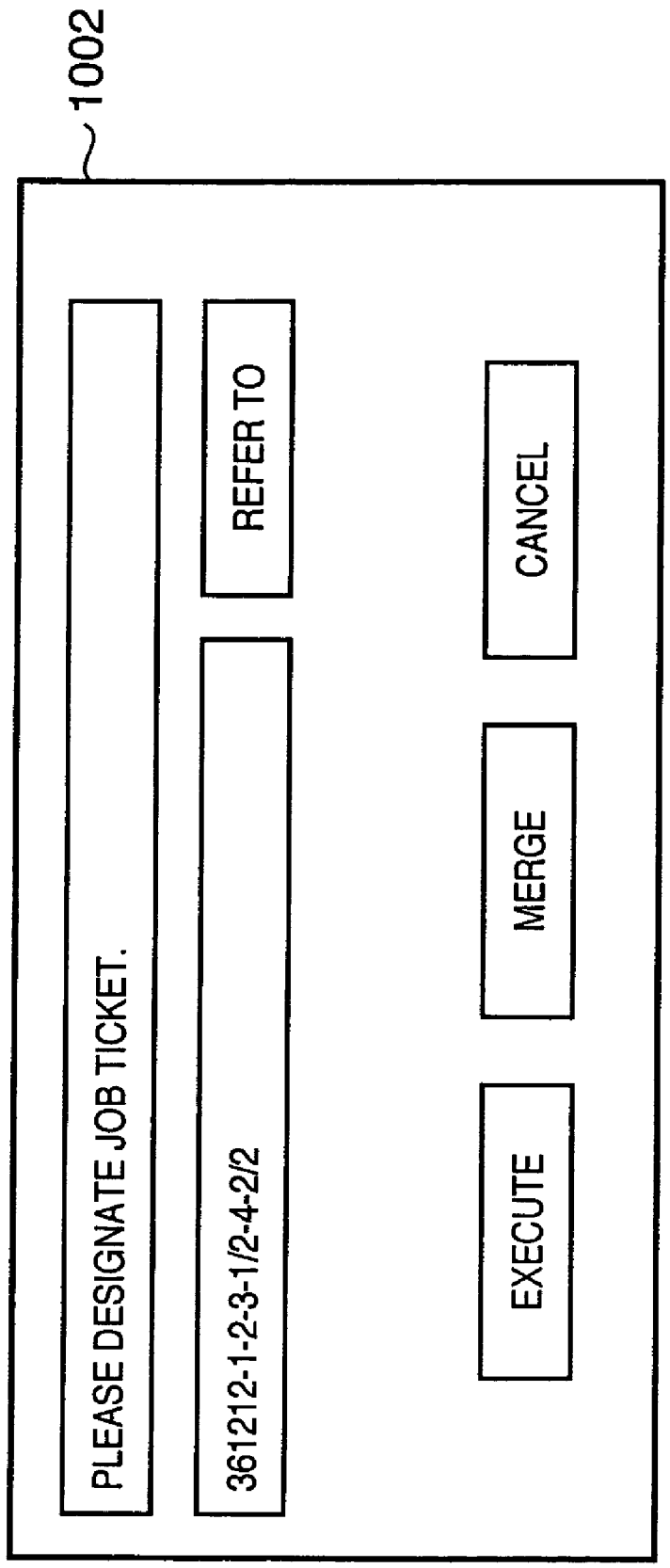

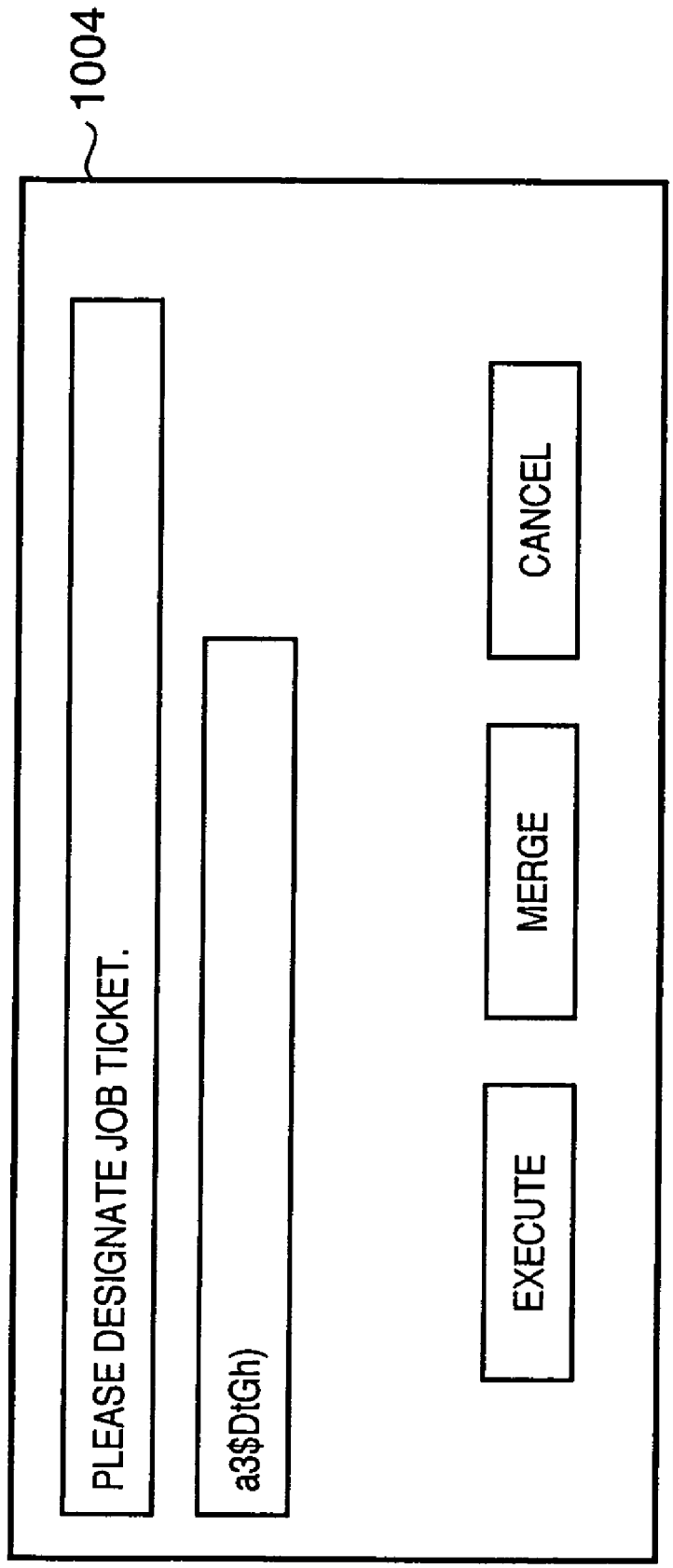

SEARCH FOR DIVISION STEP BY SHIFTING POINTER

```
361212 — 1 — 2 — 3 — 1/2 — 4 — 2/2
              |    |    |    |    |    |
              |    |    |    |    |    |— LATTER HALF OF TWO
              |    |    |    |    |— DIVISION OCCURS IN STEP 4.
              |    |    |    |— FORMER HALF OF TWO
              |    |    |— DIVISION OCCURS IN STEP 3.
              |    |— STEP 2 NORMALLY ENDS.
              |— STEP 1 NORMALLY ENDS.
              |— ORIGINAL JOB NAME
```

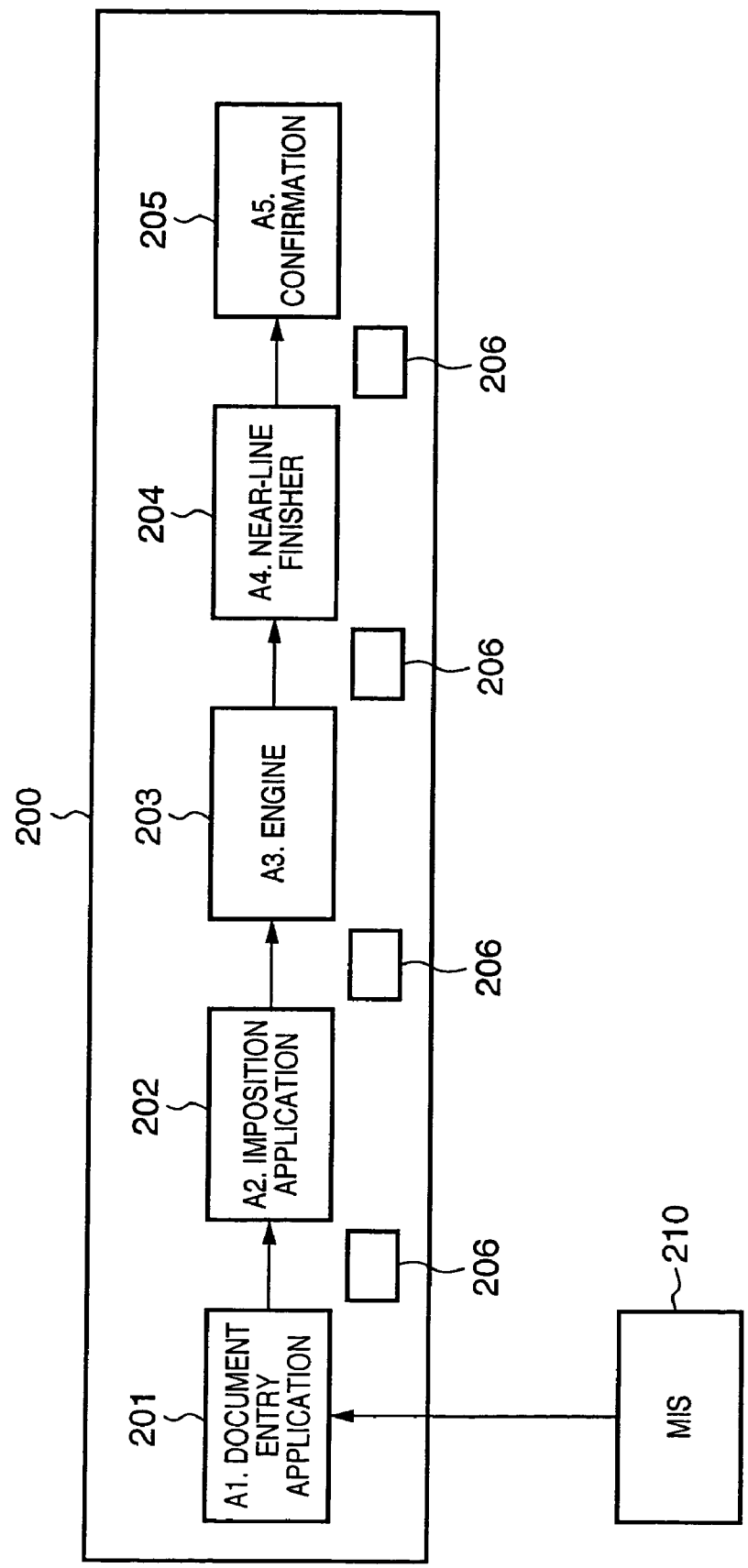

FIG. 17

```
JOBTICKET
---361212
JobName         361212-1-2-3-1/2-4-2/2                        ~1701
SubJobName      361212-1-2-3-2/2
~~~~~~~~~~~~~~~~~~~~~~~~~~~~~~~~
~~~~~~~~~~~~~~~~~~~~~~~~~~~~~~~~

STEP A3: ENGINE
         <DEVICE NAME>            ABCD
         <OUTPUT PAGES>           3-1/2  50 PAGES
         <TALLY PASSWORD>         a3$DtGh)
         <UNOUTPUT JOB>           3-2/2  70 PAGES
STEP A4: FINISHER
1702──   <DEVICE NAME>             NearLine Finisher BB
         <PROCESSING PAGES>        72 PAGES
         <PROCESSED PAGES>         A3  72 PAGES
         <NUMBER OF PROCESSED COPIES>  6 COPIES
         <OPERATOR NAME>           matsui
         <WORK CONTENTS>           CASE BINDING

STEP A5: CONFIRMATION

JobEnd          361212-1-2-3-1/2-4-2/2
```

INFORMATION PROCESSING APPARATUS AND JOB PROCESSING APPARATUS

BACKGROUND OF THE INVENTION

1. Field of the Invention

The present invention relates to a printing system which prints using a job ticket and, more particularly, to an information processing apparatus which prevents interruption of all printing processes even when a fault or the like occurs during processing, a control method and a program therefor.

2. Description of the Related Art

A printing agent creates a printed material, e.g., magazine, newspaper, brochure, advertisement, or photograph, in accordance with an order received from a third party, i.e., a customer or client, to create the printed material. The printing agent delivers the printed material to the client, and collects a fee from the client. The mainstream in the commercial printing industry is printing using a large-scale printing apparatus, such as an offset reproduction printing press. In the printing industry, work proceeds through various steps, which may include, but are not limited to, entry, design & layout, comprehensive layout, i.e., presentation using a printer output, proofreading, i.e., layout correction and color correction, proof, i.e., proof print, block copy preparation, printing, post-processing, and shipping.

The recent advent of high-speed, high-quality electrophotographic and inkjet printing apparatuses has given rise to a print-on-demand (POD) market. The POD market handles jobs that are comparatively smaller than jobs handled by a printing apparatus in a requested delivery period, and without using any large-scale apparatus or system.

Instead of a conventional large-scale printing apparatus or system, the POD market employs digital printing using electronic data by making the best of a digital image processing apparatus, which may include, but are not limited to, a digital copying machine or a digital multifunctional peripheral. In the POD market, digital technology is adapted more than in the conventional printing industry, and management and control using computers are becoming popular.

For example, the POD generates a schedule to complete processing by a deadline. To efficiently advance processing, the POD generates a POD workflow by combining a plurality of processing steps, and prints using a job ticket. The job ticket is an electronic representation of work steps of data to be printed. A print shop or the like which undertakes POD need only print in accordance with a job ticket. The job ticket is thus an indispensable technology for automating processing. Details of the job ticket will be explained hereinafter.

Japanese Patent Laid-Open No. 2004-164570 discloses a method of advancing workflow processing using a job ticket. The reference discloses a method of generating a job ticket corresponding to a generated workflow, and performing necessary processes in accordance with the job ticket as issued from a workflow generation apparatus.

As an apparatus (finisher) for performing post-processing (finishing processing) for a printed material, a near-line finisher that connects via communication with a printing apparatus and a computer serving as the control apparatus of the printing apparatus is being implemented. The near-line finisher is independent of the printing apparatus, and thus has superior function extension and substitutability. The near-line finisher also contributes to processing automation because it can receive an electronic job ticket via communication, and execute processes described in the job ticket.

The technique disclosed in Japanese Patent Laid-Open No. 2004-164570 can generate a job ticket corresponding to a generated workflow. However, the technique so disclosed does not consider, e.g., generation of an error during processing in accordance with a job ticket. To continue processing in accordance with a job ticket after generation of an error during processing according to contents described in the job ticket, the generated error must be canceled before successive processing may be performed. For this reason, the processing completion time of a print job may be delayed by the time in which the processing is interrupted. For example, in a workflow of performing finishing processing, i.e., post-printing processing, the workflow cannot advance to the post-printing processing step after printing by a digital printing apparatus before the end of the printing processing step. If an error occurs during printing, a print sheet output halfway cannot shift to finishing processing. After the error is canceled in the printing step and all print results (printed materials) to be finished are prepared, finishing processing starts. Thus, the time to completion is delayed by the time required for error recovery.

In the POD market, for example, schedule information is generated from delivery information, and processing proceeds in such a manner to meet the delivery date. Thus, a delay in the completion time may lead to a serious loss.

SUMMARY OF THE INVENTION

The present invention has been made to overcome the conventional drawbacks, and has as its object to efficiently advance processing even if the workflow is interrupted. To this end, another object of the present invention is to provide an information processing apparatus capable of dynamically generating a job ticket and processing the workflow in accordance with the job ticket when an event that meets a predetermined condition occurs, a control method and a program therefore.

In order to solve the problems, the present invention comprises the following arrangement:

a job processing apparatus which executes a processing step on the basis of a job ticket defining processing parameters and a processing order of processing steps comprises a reception unit adapted to receive the job ticket, a recognition unit adapted to recognize a processing content of a processing step of interest that is defined in the job ticket received by the reception unit and is to be executed by the job processing apparatus, a detection unit adapted to detect a processing status of the process recognized by the recognition unit, identification unit for identifying a processed part of a print job and an unprocessed part of the print job on the basis of the processing status, when the processing status detected by the detection unit satisfies a job ticket dividing condition, a job ticket generation unit adapted to generate a first job ticket that describes a processing parameter of the processed part for a next step, in order to process the processed part in the next step that has been identified by the identification unit, and a delivery unit adapted to deliver the first job ticket generated by the job ticket generation unit to a device-which executes processing in the next step.

According to another aspect of the present invention, the present invention comprises the following arrangement:

an information processing apparatus which manages workflow information that defines a processing sequence of processing steps and information on each device that executes each processing step, and generates a job ticket for executing a print job in accordance with the workflow information, comprising a reception unit adapted to receive a processing status of a processing step of interest among the processing steps from a device which executes processing pertaining to the processing step of interest, an identification unit adapted to identify a processed part of the print job and an unprocessed part of the print job on the basis of the processing status, when the processing status of the processing step of interest received by the reception unit satisfies a job ticket dividing condition, a job ticket generation unit adapted to generate a first job ticket describing a processing parameter of the processed part for a next step, in order to process the processed part identified by the identification unit in the next step, and a delivery unit adapted to deliver the first job ticket generated by the job ticket generation unit to a device which executes processing in the next step.

The present invention can dynamically generate a new job ticket even during workflow processing in order to efficiently advance processing. Processing can efficiently proceed in accordance with the progress of the process.

Further features of the present invention will become apparent from the following description of exemplary embodiments with reference to the attached drawings.

BRIEF DESCRIPTION OF THE DRAWINGS

FIG. 3 is a view showing an example of the structure of a job ticket;

FIG. 4 is a schematic view of the system when adopting the present invention;

FIG. 5 is a view of an example of the structure of the job ticket;

FIG. 6 is a view of the structure of the job ticket;

FIG. 8A is a view of an example of the structure of a job ticket 704;

FIG. 8B is a view of an example of the structure of a job ticket 702;

FIG. 9 is a view of the structure of a merged job ticket;

FIG. 10A is a view of an example of a panel display when merging job tickets;

FIG. 10B is a view of an example of a panel display when merging job tickets;

FIG. 10D is a view of an example of a panel display when merging job tickets;

FIG. 16 is a schematic view of workflow execution procedures according to a second embodiment;

FIG. 17 is a view showing an example of a job ticket after executing activities associated with a merged job ticket;

DESCRIPTION OF THE EMBODIMENTS

First Embodiment

Figure 1:
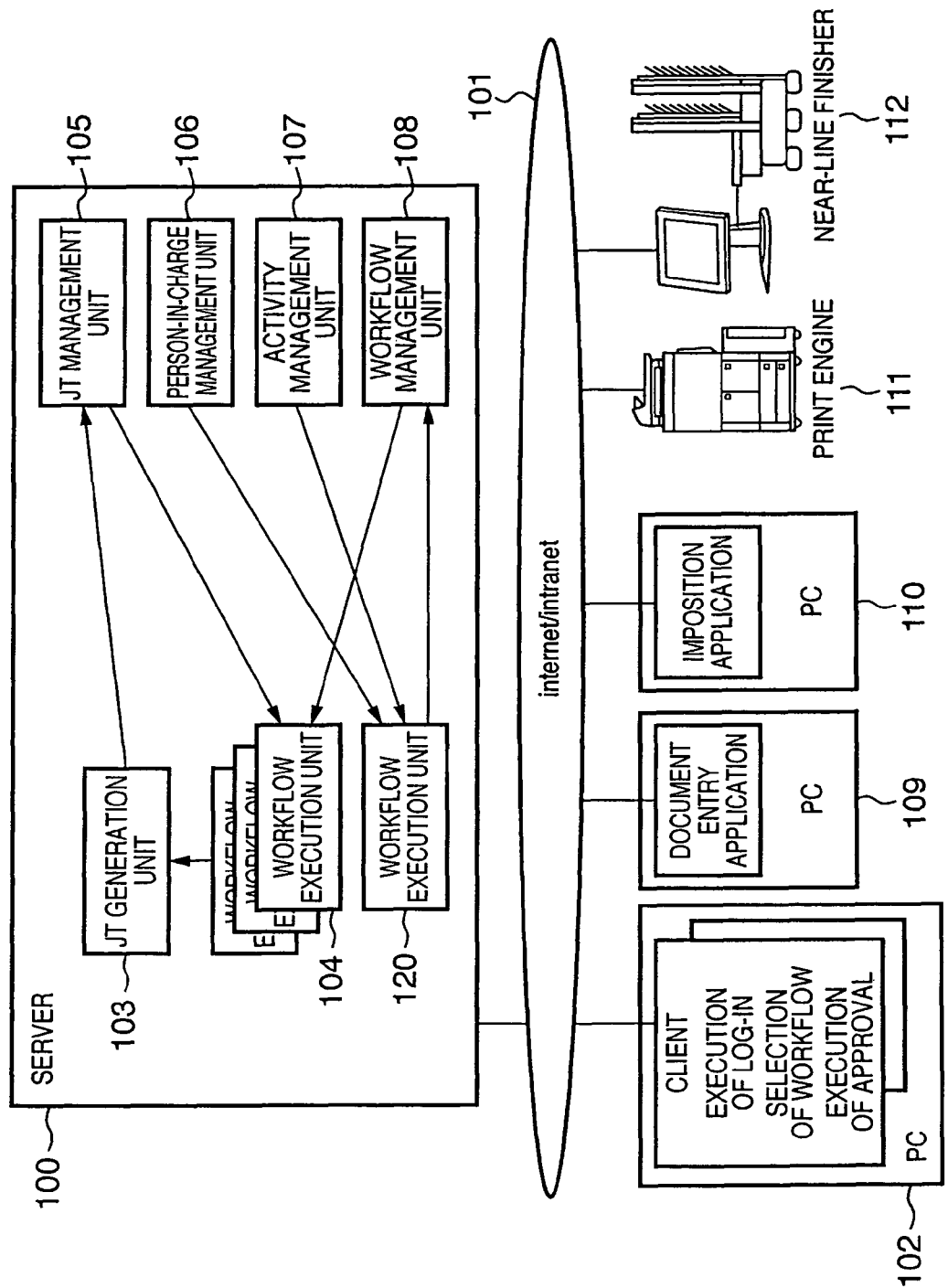
FIG. 1 is a schematic view of a printing system according to the first embodiment of the invention.

The first embodiment according to the present invention will be described in detail hereinafter, with reference to the accompanying drawings.

Definitions

Several terms used in the embodiment will be explained and defined. A near-line finisher comprises a means for communicating with an external apparatus such as a host computer. The near-line finisher is capable of receiving a job ticket from the external apparatus via communication to configure processing content to be executed in the finisher. A user can also manually input a job ticket via the operation unit of the finisher. The paper path is not physically connected to the near-line finisher between the near-line finisher and the printing apparatus.

A workflow is the flow of printing processing, including post-processing. According to the embodiment, information described in a format amenable to being processed by a computer is particularly called the workflow, or workflow information. Although the embodiment describes the flow of printing processing as the workflow, the workflow is not limited to printing processing. The workflow is information which describes, in accordance with the processing order, activities, also called processing steps, that form the workflow. Each activity describes a processing execution entity and the content of processing to be executed. The execution entity need not be a device or the like, and may be the name or job title of a person in charge, or the like. Processing content may be a general description of the operation, and do not require a detailed description of the object of the processing. Since a job ticket is generated on the basis of an execution entity or an operation described in each activity, it is preferable to describe the execution entity or the operation in the activity in a predetermined format, or grammar, and vocabulary, or reserved word, rather than in a natural language.

A job ticket is a collection of data that describe processing content in various steps of printing processing. The job ticket is also called job control information. The job ticket is electronic data of a work instruction document, which describes information representing the content of a work instruction. The job ticket is data described in, e.g., Job Definition Format (JDF), which is defined using XML (extensive Markup Language). It is permissible, however, for the present invention to use even a job ticket described in a nonstandard format. The job ticket describes parameters and the like for processing executed by a device or the like which implements each activity of the workflow. The device includes various devices, e.g., a printer, near-line finisher, and image scanner, as well as a document reception processing application and imposition application executed in a general-purpose computer. The embodiment sometimes refers to the device as a logical device, including an independent hardware device and a device executed in software.

Each device executes processing in accordance with parameters described in a job ticket. According to the embodiment, a device which executes processing describes the status of completed processing, including uncompleted processing, in addition to process content to be executed. The content is written to a job ticket after the conclusion of processing by each device. An example of the concrete structure of the job ticket will be explained hereinafter, with reference to FIG. 3, etc.

Figure 21:
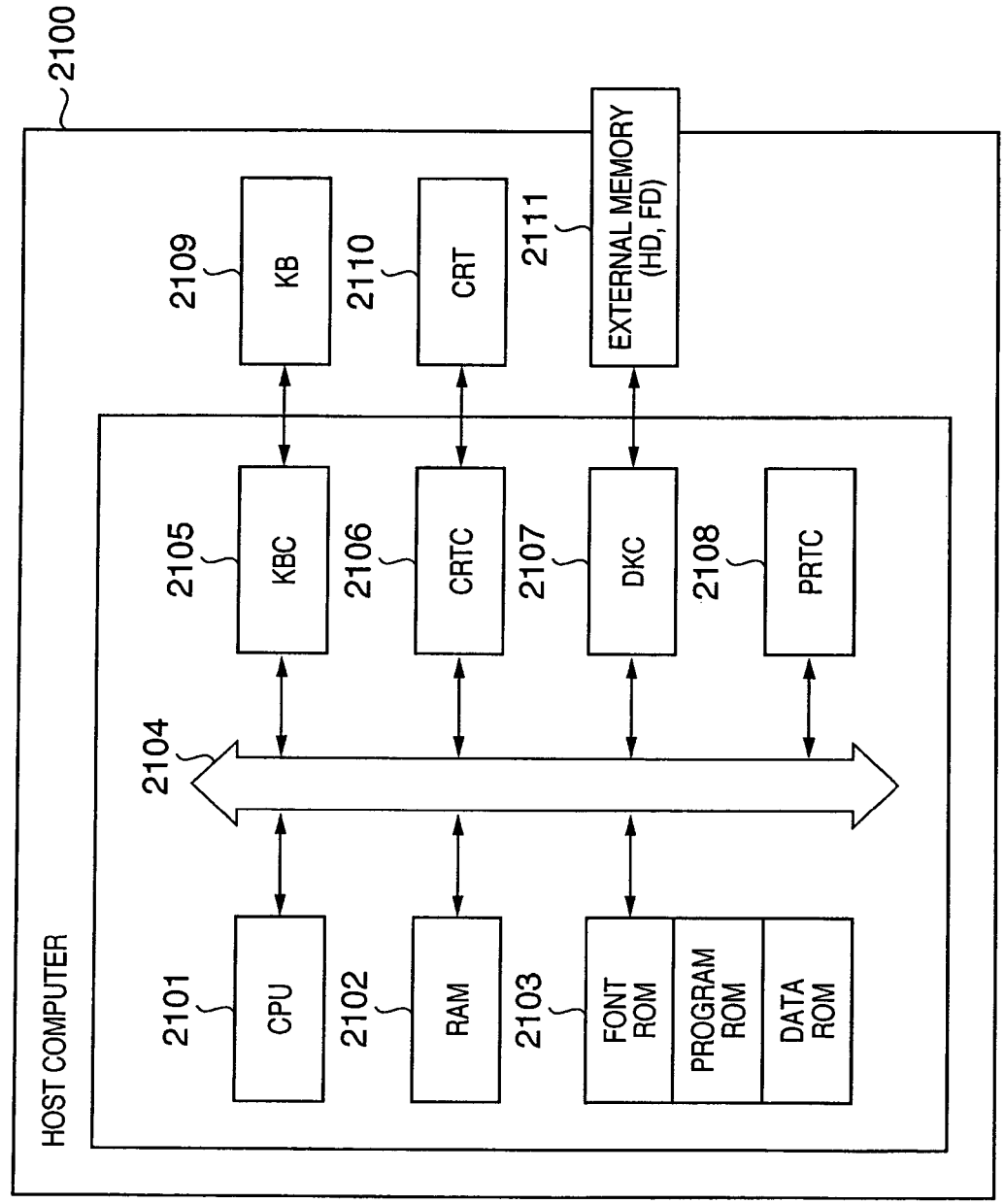
FIG. 21 is a block diagram of an information processing apparatus.

FIG. 21 is a block diagram for explaining an information processing apparatus according to the embodiment. Unless otherwise specified, the present invention is applicable to a single device, a system formed from a plurality of devices, or a system that is connected via a network, such as a LAN or a WAN, and performs processing. Although the first embodiment describes a client computer, the present invention is not limited thereto, and any information processing apparatus employs an arrangement similar to that in FIG. 21. Hence, an MIS server (described hereinafter) has an arrangement similar to that in FIG. 21.

In FIG. 21, a host computer 2100 comprises a CPU 2101, which executes processing of a document that may contain a mixture, which may include, but is not limited to, a figure, an image, text, or a table, which in turn may include, but is not limited to, a spreadsheet, in accordance with a program stored in the program ROM of a ROM 2103, a document processing program, or the like. The CPU 2101 comprehensively controls devices connected to a system bus 2104.

The program ROM of the ROM 2103 or an external memory 2111 stores, for example, an operating system program (OS) that serves as a control program of the CPU 2101. The font ROM of the ROM 2103 or the external memory 2111 stores font data and the like used in document processing. The data ROM of the ROM 2103 or the external memory 2111 stores various data used to perform the document processing and the like.

A RAM 2102 functions as a main memory, a work area, and the like for the CPU 2101. A keyboard controller (KBC) 2105 controls a key input from a keyboard 2109 or a pointing device (not shown). A CRT controller (CRTC) 2106 controls display on a CRT display (CRT) 2110.

A disk controller (DKC) 2107 controls access to the external memory 2111, such as a hard drive (HD), which stores a boot program, an application, font data, a printer control command generation program (printer driver), and the like. The DKC 2107 can also control access to a floppy disk.

A printer controller (PRTC) 2108 connects to an external device via a predetermined bidirectional interface 2121, and executes communication control processing in conjunction with the external device. The CPU 2101 executes opening, or rasterization, processing of an outline font in a display information RAM that is configured in, e.g., the RAM 2102, and enables WYSIWYG on the CRT 2110.

The CPU 2101 opens various registered windows and executes various data processes in accordance with commands that are designated with the mouse cursor (not shown) or the like, on the CRT 2110. In printing, a user opens a window associated with print configuration, and configures the printer and a printing processing method to the printer driver, including print mode selection. Unless otherwise specified, the arrangement of the information processing apparatus shown in FIG. 21 applies to an MIS to be disclosed in the specification.

System Configuration

FIG. 1 is a schematic view of a printing system according to the first embodiment of the invention. In FIG. 1, the printing system comprises a printing system server 100, a network 101, which may be the Internet or an in-house intranet, and a client 102 comprising a personal computer, software, and the like. The printing system also comprises a personal computer 109 (document reception application 109) in which a document reception application is installed. The printing system also comprises a personal computer 110 (imposition application 110) on which an imposition application is installed. The printing system further comprises a printing apparatus (print engine) 111 which prints on printing paper, and a near-line finisher 112, which performs post-processing such as bookbinding and trimming.

The document reception application is application software for entering a document. The document reception application 109 converts input data, such as image data or text data, into a predetermined format, e.g., Portable Document Format (PDF). The document reception application 109 may be installed on the client 102, or may exist in another computer on the network 101. The imposition application 110 is a program for designating an output result of block copy electronic data as a printed material. The imposition application 110 allows a user to designate imposition designation, such as 2in1 double-sided printing, or 1in1 case binding printing, on an easily viewed UI. The imposition application 110 converts electronic data of a document output from the document reception application 109 in accordance with imposition designation. The converted electronic data enters the print engine 111. For example, the converted electronic data is data obtained by changing, in accordance with imposition designation, the page layout described in PDF, or data which is obtained by describing, in accordance with a predetermined PDL (Page Description Language), the page layout described in PDF. In any case, the converted electronic data may be interpreted and executed by the print engine 111. Devices, e.g., the document reception application 109 and the imposition application 110, that are used in the workflow, correspond to a job ticket. For example, a computer executes a program, which is called a job ticket processing program, for receiving and displaying a job ticket, accepting an input from a user, and transmitting the job ticket together with the accepted input to the server 100. If necessary, this program can set up the parameters of an activity described in the job ticket, in a device which executes the activity.

The print engine 111 prints on a print paper on the basis of inputted electronic data, also called print data. Unlike an in-line finisher accessory to a printing apparatus, the near-line finisher 112 performs finishing processing for a manually placed printed material, in accordance with job control information, such as a job ticket that is designated via a network. A finisher similar to the near-line finisher is an off-line finisher, which does not connect to a network and receives job control information, such as a job ticket, from an electronic medium, such as a floppy disk. The near-line finisher starts processing after the manual placement of a target printed material at a predetermined position. Hence, an operator inputs a trigger to commence processing. At this time, the operator can designate a job merge or the like, as shown in FIGS. 10A-10D.

The server 100 comprises a job ticket (JT) generation unit 103, a workflow execution unit 104, a job ticket (JT) management unit 105, a user management unit 106, an activity management unit 107, a workflow management unit 108, and a workflow generation unit 120. The job ticket management unit 105, the user management unit 106, the activity management unit 107, and the workflow management unit 108 are storage areas, or management programs having storage areas provided by a memory, external memory, or the like. The server computer 100 executes a program to implement the job ticket generation unit 103, the workflow execution unit 104, and the workflow generation unit 120. Hardware having circuits equivalent to the programs can also implement the job ticket generation unit 103, the workflow execution unit 104, and the workflow generation unit 120.

The workflow generation unit 120 is software for allowing a user to define a workflow using defined activities that are saved in the activity management unit 107. The workflow management unit 108 saves the defined workflow. At this time, the workflow management unit 108 may collate a log-in user with a user authority that is saved in the user management unit 106, and check whether the user has an authority to define a workflow. The job ticket generation unit 103 generates a job ticket corresponding to a workflow to be executed by the workflow execution unit 104, and saves the job ticket in the job ticket management unit 105. The workflow execution unit 104 may generate a job ticket. The workflow execution unit 104 simultaneously operates one or more workflows that are saved in the workflow management unit 108. To operate a workflow, the workflow execution unit 104 dynamically updates a job ticket before execution of each activity, and flexibly executes the workflow. The job ticket management unit 105 holds a generated job ticket until the end of the workflow. A device which executes an activity transmits a job ticket to the server 100 after executing the activity. The server 100 receives the job ticket and saves it in the job ticket management unit 105. The received job ticket is updated for the next activity. The person-in-charge (user) management unit 106 holds the authority of a log-in user, and the like. The activity management unit 107 saves and manages an activity that means a work step to be executed in the workflow. For example, definitions such as "entry by a chief", "imposition by a temporary employee", "approval by a department manager", and "wrapping printing by a printing agent" can be registered as activities. In general, an activity is a combination of a person in charge and work. The workflow management unit 108 saves and manages a workflow defined by a user or administrator. The workflow management unit 108 manages a plurality of workflows defined by a user, such as "wrapping printing approved by a section chief", or "print 100 copies by a department manager". Such a name is assigned to a workflow, and the activity management unit 107 defines the workflow as a sequence of defined activities. For example, a workflow named "wrapping printing approved by a section chief" includes a series of defined activities arranged in an order of "entry by person A in charge", "imposition by person B in charge", "approval by administrator C", "double-sided printing", and "case binding".

Workflow

Figure 2:
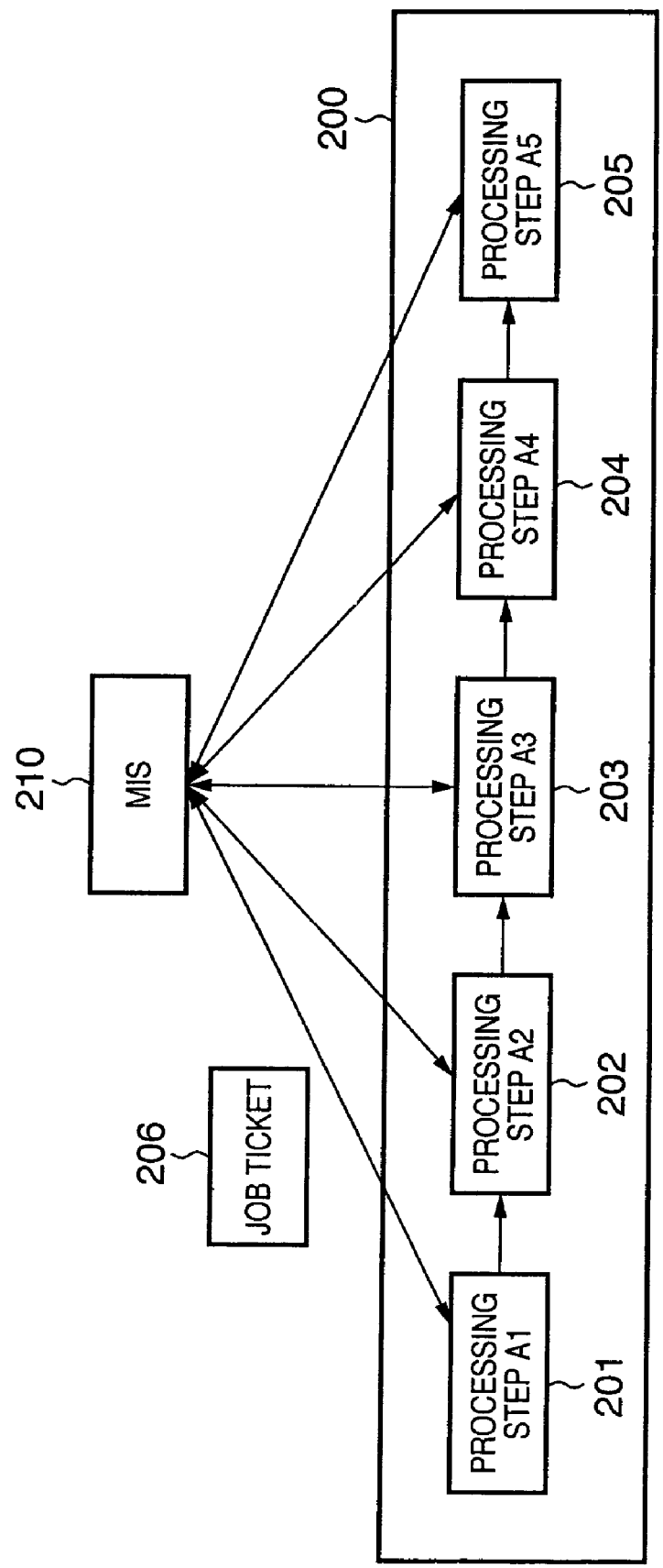
FIG. 2 is a block diagram showing an example of a definition of a workflow.

FIG. 2 shows an example of a definition of a workflow. In FIG. 2, a workflow 200 includes activities 201-205 arranged in series. The activity, or processing step, 201 is to activate the document reception application. For example, the activity 201 is defined as "entry by person A in charge". Although this definition may be described in a natural language, such as the example in FIG. 2, it may also be described with a special rule. For example, the description is "operation name"+"by"+ "subject name". When the printing system can select an appropriate execution entity, the entity description may be omitted. In any case, the definition is described in a format that may be interpreted by the workflow execution unit 104, as executed by a computer. After the activity 201 ends, the workflow advances to the activity 202. The activity 202 is to activate the imposition application. For example, the description of the activity 202 is "imposition by person B in charge". Similarly, the activity 203 is to print on a printing paper. For example, the description of the activity 203 is "double-sided printing". In the present example, the printing system, e.g., workflow execution unit, can appropriately select a printing apparatus having the double-sided printing function, and thus, the activity 203 does not describe any entity. The activity 204 is to execute finishing with a near-line finisher. For example, the description of the activity 204 is "case binding". The activity 205 is to have an administrator or the like confirm the content of an outputted result. For example, the description of the activity 205 is "approval by administrator C".

In this manner, the activities 201 to 205 are coupled to form one workflow. Workflow information can be obtained as e.g., a data file in which the names (A1, . . . , A5 in FIG. 2) of the activities are arranged in the execution order. The activity management unit 107 saves the activity entities. A job ticket 206 has a structure shown in detail in FIG. 3. For example, the job ticket 206 is generated in accordance with the workflow 200. The job ticket may also be generated in accordance with information ordered from a customer. For each processing step, an MIS (management server) 210 transmits a job ticket to the execution entity of the processing step. Each device replies to the MIS 210 every time the processing step ends. If an abnormality, such as a lack of printing paper, occurs during the workflow, e.g., during the activity 203 in FIG. 2, print job data is divided into a part that is processed by the activity, and an unprocessed part. The job ticket is also divided in accordance with the divided print jobs. Workflows proceed in accordance with the divided jobs, and then are merged. The content of a job ticket will be described hereinafter. The MIS 210 is identical to the server 100 in FIG. 2.

Job Ticket

FIG. 3 shows an example of a structure of a job ticket. FIG. 3 shows an example of the job ticket before execution of the workflow. Reference numeral 301 denotes a start mark of a job ticket, and 302, an original job name. It is preferable for the job name to be associated with a base workflow name. In the present example, the original job name 302 is "361212". Reference numeral 303 denotes a job name. The job name of a job ticket that has not been divided is the same as the original job name. In the present example, the job name 303 is. "361212", which is the same as the original job name. Client information 304 is "kazuta", payer information 305 is "matsueda", a destination 306 is "xxxxxx-yyyyyy", and a server name 307 is "stargate". A user inputs these values in creating a workflow, and the values contained in the workflow information are available for creating a job ticket. The server name is the name of the server 100. A start date & time 308 represent the date and time when the job ticket is generated. Reference numerals 309-313 denote work steps executed in correspondence with activities. The work step 309 represents the contents of the activity 201. Similarly, the work step 310 represents the work contents of the activity 202, 311, those of the activity 203, 312, those of the activity 204, and 313, those of the activity 205. Reference numeral 314 denotes a job ticket end mark.

The activity management unit 107 saves the content of the activity. When generating a job ticket, the job ticket describes processing content in accordance with content corresponding to activities by referring to the activity management unit 107. In the example, the activity management unit 107 describes activities such as "document reception by person A in charge", "double-sided case binding and imposition by person B in charge", "approval by administrator C", "double-sided printing", and "case binding", in correspondence with the activities A1-A5. The workflow execution unit 104, or the job ticket generation unit 103, converts the activity content into parameters for their execution, and describes the parameters in a job ticket. The parameters include, e.g., the identifier and address of a device, the type of processing, and parameters necessary for the processing. For example, with the activity "entry by person A in charge", the job ticket generation unit 103 checks the identification name and address of a computer that executes the document reception application. In step 1 of the job ticket, the job ticket generation unit 103 describes activity content and the like to be displayed to an operator. With the activity "case binding", the job ticket generation unit 103 checks the identifier and address of a finisher that executes "case binding". In step 4 of the job ticket, the workflow execution unit 104 describes necessary parameters that correspond to the type and content of finishing processing.

Outline of Workflow Execution

FIG. 4 is a view showing an example of a workflow execution procedure according to the embodiment. An example of normal workflow execution procedures will be described. The workflow execution unit 104, or the job ticket generation unit 103, reads a designated workflow from the workflow management unit 108. The job ticket generation unit 103 generates a job ticket corresponding to the workflow. At this time, the job ticket generation unit 103 adds necessary information to steps corresponding to activities contained in the job ticket. That is, the job ticket generation unit 103 describes information to be added to the job ticket on the basis of order information. The job ticket is sent to a device or the like which executes a target step. For example, the order is to print a 10-page printed material by five copies and bind each copy. In this case, the job ticket generation unit 103 generates a job ticket that contains information which instructs a device in charge of printing processing to print five copies of 10 pages each. The job ticket generation unit 103 generates a job ticket that contains information that instructs a device in charge of post-printing processing to bind every 10 pages five times. Since the job ticket describes information, i.e., parameters, necessary to execute a target step, each device or the like reads a target line of the job ticket, and executes the step in accordance with the described parameters. The target line can be detected by collating, e.g., the device identifier of a device that receives a job ticket, with a device ID described in each step of the job ticket. The workflow execution unit 104 sends the job ticket in an order defined in the workflow to devices or the like which are to execute activities of the workflow. Accordingly, the activities are executed in the order defined in the workflow. More specifically, the workflow execution unit 104, or the job ticket generation unit 103, converts the content of each activity into parameters for executing the activity, e.g., a device identifier, a processing type, and the processing parameters. Some processing parameters, such as the paper size, may be determined on the basis of the processing result of a preceding activity, e.g., the processing result in the imposition application 110. It is also possible to determine parameters in advance, in accordance with the workflow and order information.

For example, when an activity of interest is document reception, the workflow execution unit 104 transmits a job ticket describing the document reception step to a computer on which the document reception application serving as a device to execute the step is installed. When document reception processing is executed in accordance with an operation by an operator, the description content of the job ticket are the identifier of a device to execute processing, and the description of an instruction to the operator. The job ticket processing program of the computer which has received the job ticket reads described information in correspondence with the step, and displays, e.g., the operator name, the processing content, e.g., "entry by person A in charge", and the described information. If a person in charge logs in, the job ticket processing program authenticates him and permits a designated person in charge of document reception to enter a document. The person in charge can be authenticated by searching a directory server (not shown) or the like for the identification name of the person in charge described in the job ticket, and collating the identifying name. The person in charge designates data to be entered, and the document reception application completes such processing as conversion into a predetermined format. The converted data is stored in a folder, known as a hot folder, that has been designated in advance. The computer on which the document reception application is installed adds the entered file name, the hot folder name, including the location, as needed, the size, the processing start time, the completion time, and the like to the job ticket finalized after processing. If the operator designates information, the computer also adds the information. For example, the operator may designate the number of copies at this stage, and the computer writes it in the job ticket. Finally, the computer on which the document reception application is installed transmits the updated job ticket to the workflow execution unit 104.

The foregoing operation similarly applies to processing which requires operator intervention. Where processing free from any operator intervention is concerned, the job ticket describes parameters suited to a device which executes an activity. For example, for a "double-sided printing" activity, the workflow execution unit 104, or the job ticket generation unit 103, determines a device which executes this activity. The workflow execution unit 104 writes such print settings as the paper size and double-sided printing in the job ticket, and transmits the job ticket to the print engine 111. The format complies with a standard such as Job Definition Format (JDF). The remaining processing is similar to processing which requires operator intervention. The server 100 manages information on devices connected thereto. For example, with a device that processes the "double-sided printing" activity, the workflow execution unit 104 specifies a device capable of executing double-sided printing from device information managed on the server 100. The workflow execution unit 104 generates a job ticket describing content to be processed by the device.

Some processes have parameters corresponding to subsequent processing. For example, imposition by the imposition application is done in accordance with the print order and the type of finishing processing, especially bookbinding processing. In bookbinding processing, a predetermined number of printed sheets are folded in half and stapled, bundles are stacked, and a spine cover is attached. The number of sheets to be folded in half, the folding direction, and the like determine the page layout in imposition processing. Furthermore, device functions restrict the processing method. For this reason, the workflow execution unit 104, or the job ticket generation unit 103, determines a job ticket to execute an activity of interest, in accordance with the overall workflow and the functions of the device to be used.

An example of workflow execution procedures when dividing a job will be described with reference to FIG. 4. In FIG. 4, when a fault, such as a lack of printing paper, occurs during processing by the print engine 111 in activity A3, the MIS divides the job ticket 206 into job tickets 401 and 402, and assigns jobs to the job tickets 401 and 402. More specifically, the MIS divides an original job into a job related to a portion printed before interruption, and a job related to a portion left unprinted because of interruption. The MIS also divides the job ticket into the job ticket 401 of the job related to the printed part, and the job ticket 402 of the job related to the unprinted part. By dividing one job into a plurality of jobs with differing progress states, interruption of the workflow can be prevented to advance the processed part to forthcoming activities. In the present example, a job ticket 403 for processing a next processing step can be generated from the job ticket 401 to advance the step to the next processing.

Upon dividing, the job ticket 402 is independent of the job ticket 403. The job ticket 402 can start processing after recovery from the fault, regardless of the progress of the job ticket 403. A job ticket 404 is a post-processing ticket in accordance with the job ticket 402. As will be described with reference to FIG. 13 and the like, a job ticket for executing a given activity changes in content before and after processing, because information is added after the end of the activity.

<Division of Job Ticket>

FIG. 5 shows an example of the structure of the job ticket 401 after dividing. FIG. 6 shows an example of the structure of the job ticket 402 after dividing. A job ticket before dividing, i.e., a job ticket transmitted from the print engine 111 to the workflow execution unit 104, has almost the same contents as those in FIG. 5. Since the job is original, the job name is "361212".

Figure 11:
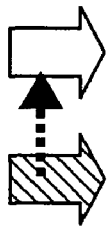
FIG. 11 is a view showing details of a job name.

FIG. 5 is a view showing an example of the structure of the job ticket 401. A job name 501 is "361212-1-2-3-1/2". The job name means that steps 1 and 2, corresponding to the activities A1 and A2, that are contained in the original job name "361212", are successful, signified by "1-2-". The job name also means that step 3, corresponding to activity A3 is divided into two, and the job is the former job, signified by "-3-1/2". In other words, a job name after the dividing of a job ticket is given by "original job name+the identification number (repeat) of a successful step+the identification number of a divided step to be executed+an identifier representing the position of the divided job in the total job". In FIG. 5, the "identifier representing the position of the divided job in the total job" is represented by the fractional form in which the denominator is the division count, and the numerator is a number representing the ordinal number of the divided job. FIG. 11 is a view showing details of the job name. FIG. 11 shows an example of a job ticket further divided in step 4.

A work result 502 describes the work instruction and work result of step 1. The workflow execution unit 104 or job ticket generation unit 103 describes the work instruction. A device that executed the processing describes the work result. The work result will be described. The entry file field describes an accepted file name "aaabbbccc.pdf". The start time field describes that entry is accepted at "2005 Apr. 14 19:00:01", and the end time field describes that entry ends at "2005 Apr. 14 19:00:03". The number of copies is 10. The number of copies may be designated by, e.g., a job ticket or an operator in entry. The hot folder field, which saves entered data, describes "folder1". The hot folder is a folder designated in advance for a predetermined purpose. In the present example, the hot folder is a folder designated in advance in order to save entry data. FIG. 5 shows a hot folder name on a PC which accepts entry. The processing executor field describes that "System" is a primary entity. In this manner, in step 1, information representing at least the name of an entry file and a location where the entry file is saved is added as the processing result of step 1 to the job ticket. In FIG. 5, step 1 ends without any problem, or fault.

An area 503 describes the work instruction and work result of step 2, i.e., A2: imposition application. The workflow execution unit 104 describes the work instruction for A2, details of which are not shown in FIG. 5. The work instruction is described in accordance with the workflow and the work result of a preceding step described in the job ticket. The contents of the work instruction are "double-sided case binding", and parameters representing its details. For example, the workflow execution unit 104 reads the activities of printing and finishing, and describes imposition parameters in the job ticket. In imposition, the page order is also adjusted for subsequent printing and finishing. For example, the print engine 111 outputs printed paper in an inputted page order after imposition. A finisher receives printed output paper placed on the paper feed table in an order unique to the finisher, and executes finishing processing. The order of printout pages is determined so that the finisher can accurately bind each copy, and the page layout after imposition processing is also determined in accordance with the page order. To determine the page order, for example, the workflow execution unit notifies the imposition application of execution of double-sided case binding, the number of sheets in one bookbinding unit, and the like, as parameters described in a job ticket.

A device that has executed processing describes the work result in the job ticket, as shown in FIG. 5. The work result of step 2 will be described. In the present example, step 2 ends without any problem, or fault, similar to step 1. As a result, 1up imposition, i.e., to lay out one entered page on one page of a sheet, is done for case binding using an A3 sheet. The area 503 also describes that a person in charge "yamanaka" performed processing in step 2. The area 503 also describes the use of one thick sheet as a front cover in case binding. The parameter is described when imposition is performed including the cover. The number of output copies is 10, and the number of print sheets is 120. The parameters are described when the imposition application must generate all output pages in order to make the output order in printing on the part of the print engine match the processing order on the part of the finisher. In the example shown in FIG. 5, 10 copies of 12 sheets each are wrapped and printed out, printing a total of 120 sheets. Instead of the total number of pages, the number of pages of one copy may be described, together with the number of copies. While neither the start time nor end time field is described for step 2, they are set, as needed. In step 2, at least the number of pages after imposition is added as the processing result to the job ticket. In some cases, other information is added, as shown in FIG. 5.

An area 504 shows the processing result of step 3. The device name field describes a device name ABCD. An output page field 505 describes "3-1/2" as obtained by coupling a step identification number "3", which represents that dividing is done in step 3, and an identifier "1/2", which represents that the former half has been output, and "50" printed pages. As a tally password 506, the same password is inserted into job tickets when dividing the original job ticket. In the present example, the dividing occurs in step 3, and thus, the tally password is described as an element of step 3. Although the password is "a3$DtGh)", it is arbitrary, as long as the password is unique. A field for information that is not output describes "3-2/2" as obtained by coupling a step identification number "3", which represents that dividing is done in step 3, and an identifier "2/2", representing that the latter part has been output, and "70" unprinted pages. The field represents that 70 pages remaining to be output. Fields 507 and 508, representing unprocessed steps, do not record any processing result. A field 509 describes a mark representing the end of the job, and also describes a job name after dividing. In step 3, at least the device name and the number of output pages are added as the processing result to the job ticket. If an unprocessed part remains, the number of unprocessed pages is also added to the number of output pages. In FIG. 5, the number of output pages is 50 and the number of pages remaining to be output is 70. Alternatively, output pages and pages remaining to be output may be described as 1 to 50 and 51 to 120, respectively.

A finisher for finishing processing in step 4 receives the job ticket that describes processing content to be executed by the finisher in step 4 of the job ticket 401 in FIG. 5. After receiving the job ticket in which the device in step 3 describes the processing result, the workflow execution unit 104 determines that the job ticket should be divided, and describes the parameters of processing to be executed by the finisher in the next step. For example, the workflow execution unit 104 can determine, from the job ticket 401 in FIG. 5, that pages 1 to 50 have been printed. The job ticket 401 signifies that 10 copies of 12 sheets each are wrapped and printed out to print a total of 120 sheets. The workflow execution unit 104 generates a job ticket describing execution of "case binding" for outputs 1 to 50, in units of 12 pages.

FIG. 6 is a view showing an example of the structure of the job ticket 402. A job name 601 reveals that the job ticket 402 is the latter job that was divided in step 3. A tally password 602 is the same as the password 506 in FIG. 5. Reference numeral 603 denotes a job end mark. The job ticket 402 has the same contents as those in FIG. 5, except for the job name. The job name 601 is "361212-1-2-3-2/2", according to the foregoing rule. The job name means that steps 1 and 2, corresponding to activities A1 and A2, as contained in the original job name "361212", are successful, as represented by "–1-2". The job name also means that step 3, corresponding to activity A3, is divided in two, and the job in question is the latter one, as represented by "1-3-2/2". Since the print engine 111 receives the job ticket 402 in FIG. 6 for the purpose of printing processing in step 3, the job ticket generation unit 103 does not describe any parameter of processing executed by the finisher. A device which executes printing processing in step 3 can recognize, from the job ticket 402, that 70 pages yet to be output, pages 51 to 120, are to be printed.

Merging of Job Tickets

Processing to merge jobs according to the present invention will be described. Divided jobs can merge with each other when processes associated with divided job tickets proceed to the same step. In some cases, the next step is impossible unless divided jobs are merged.

Figure 7:
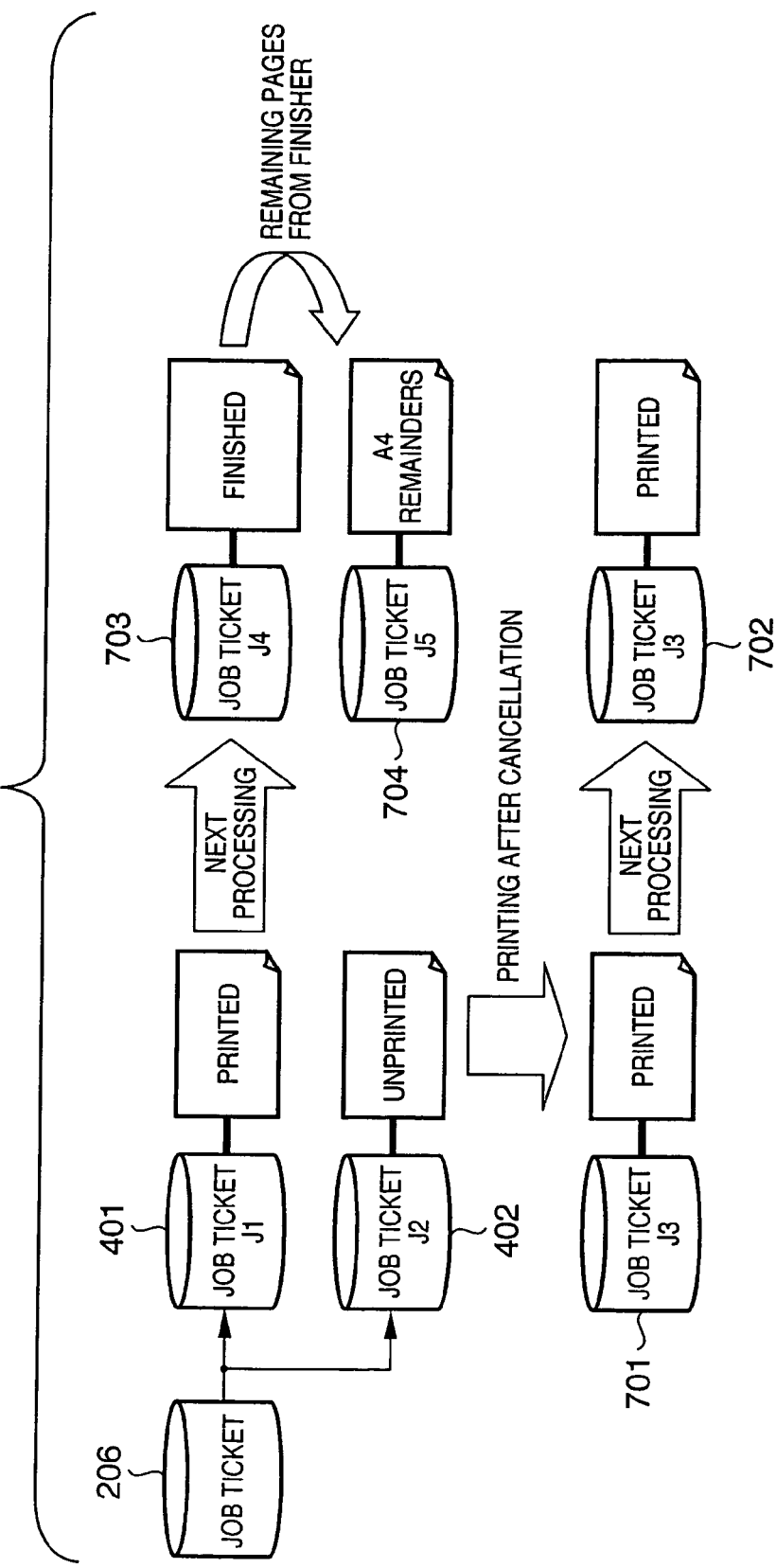
FIG. 7 is a schematic view of the system, the purpose of which is to describe a merging of job tickets.

FIG. 7 is a schematic view of the system for describing the merging of job tickets according to the present invention. In FIG. 7, a job ticket 701 represents the job ticket of a job having undergone printing after engine recovery. A job ticket 702 represents the job ticket of a job which delivers a part printed after engine recovery to the next processing step, i.e., finishing. For the job ticket 702, the next finishing processing does not start yet. In the example, finishing processing is to execute "case binding" for 10 copies in units of 12 sheets.

The job ticket 401 is further divided in two in the next finishing step. In the example, finishing processing in step 4 includes bookbinding processing, which can only be executed on a per copy basis. Odd units that are less than a full copy can be bound only after the remaining sheets are printed and combined with the odd sheets. For this reason, the job ticket 401 is divided into a job ticket, 703 corresponding to a bound part, and a job ticket 704, corresponding to an unbound part. For example, according to the description of FIG. 5, the job ticket 401 delivers 50 printed pages to processing of the finisher. Since the finisher finishes, i.e., binds, every 12 sheets, two sheets remain after binding four copies. The job is divided into a job for 48 finished pages and 2 unfinished pages. The job ticket 401 is divided into the job ticket 703, having undergone the finishing step, and the job ticket 704, not having undergone the finishing step. The job ticket 704 merges with the job ticket 702 of the job, having undergone printing after recovery of the print engine, and the merged job ticket is issued to the finisher 112 for finishing processing.

The workflow execution unit 104 executes the merge. This operation automates subsequent steps and facilitates data handling.

FIGS. 8A and 8B are views showing an example of the structures of the job tickets 704 and 702. FIGS. 8A and 8B are views of job tickets both transmitted to the finisher. The job tickets 704 and 702 do not describe any processing result in step A4. Steps before step A2 are omitted, which also applies to FIGS. 9 and 17. A job ticket 801 in FIG. 8A shows an example of the contents of the job ticket 704. A job ticket divided in work step A4 has an original job name "361212-1-2-3-1/2". According to the naming rule, the job name of the job ticket 704 is "361212-1-2-3-1/2-4/2/2", which is prepared by adding "–4/2/2" to the original job name. This name means that the job of the job ticket 704 corresponds to the latter one of jobs obtained by further dividing, in step A4, the former one of jobs divided in step A3. Since the job remaining to be output value in step A4 is "4-2/2 2 pages", step A4 of the job represented by the job ticket targets two unprocessed pages.

A job ticket 802 in FIG. 8B shows an example of the structure of the job ticket 702. A job name "361212-1-2-3-2/2" means that this job is the latter job divided in work step A3. Since the processing pages value in step S4 is "70 pages", step A4 of the job represented by the job ticket targets 70 pages. The finisher 112 reads a corresponding line, i.e., a step area where the finisher name is described as a device name, of the job ticket, and determines a parameter from the value in the unprocessed job field.

FIG. 9 is a view of the structure of a job ticket 901, obtained by merging the job tickets 702 and 704. A job ticket 901 shows that SubJobName "361212-1-2-3-2/2" is added to the job name "361212-1-2-3-1/2-4/2/2", and the jobs merge. The number of processing pages in work step A4 is 72, as a result of addition. After merging, the job can advance to processing by the near-line finisher. Addition targets are the numbers of pages to be processed in step A4 of the job tickets to be merged. That is, the processing pages value "70" in step A4 of the job ticket "361212-1-2-3-2/2", and the job remaining to be output value "2" in step A4 of the job ticket "361212-1-2-3-1/2-4/2/2", are added together. The merge condition will be described hereinafter.

FIG. 17 shows an example of a job ticket after receiving and processing the merged job ticket 901. A job ticket 1701 is transmitted to the workflow execution unit 104. A job ticket field 1702 represents the result of processing in step A4. The finisher 112 describes, in the field 1702, results such as the number of processed pages, the number of copies, the operator, and work content, as compared with the pre-processing job ticket, i.e., in FIG. 9.

Workflow Execution Procedures

Figure 15:
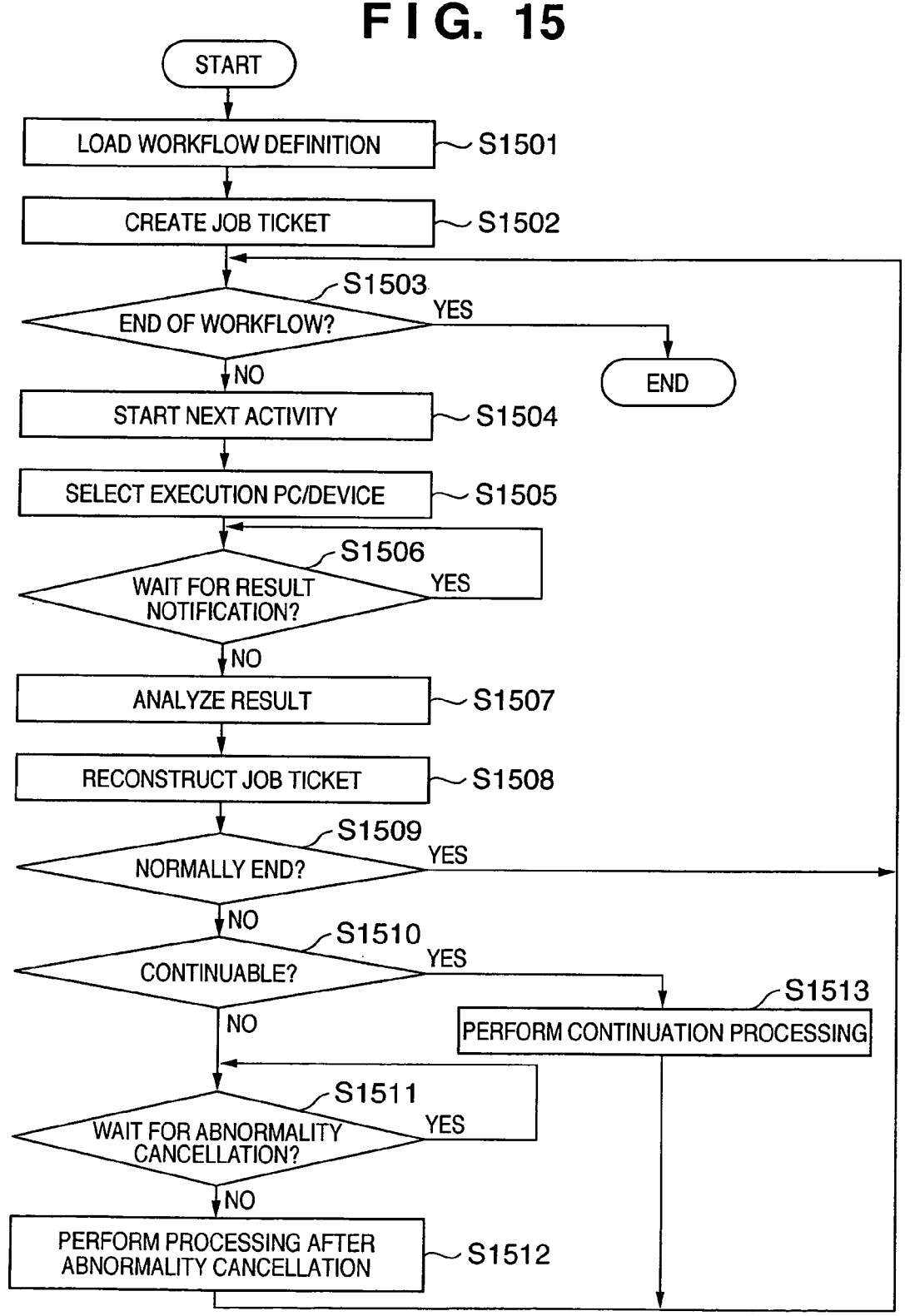
FIG. 15 is a workflow execution sequence flowchart.

FIG. 15 is a flowchart of a workflow execution sequence executed by the workflow execution unit 104. The workflow execution unit 104 performs each processing step and communication, as needed, and issues a job ticket for the next step at the conclusion of the processing step. FIG. 15 is a flowchart for the server 100, when the workflow execution unit 104 issues a job ticket to advance the workflow. The CPU of the server executes steps in the flowchart of FIG. 15. The flowchart is related to processing of an information processing apparatus, e.g., the server 100, which manages workflow information that defines the processing sequence of processing steps and information on a device that is to execute each processing step, and generates a job ticket for executing a print job in accordance with the workflow information. The execution entity may be an executable program that is maintained in the information processing apparatus.

In S1501, the workflow execution unit 104 opens a workflow that is managed in memory by the workflow management unit 108. In S1502, the job ticket (JT) generation unit 103 generates a job ticket. In S1502, the JT generation unit 103 generates a job ticket as shown in FIG. 3, in accordance with the workflow that was opened in S1501, or the acquired order information. The job ticket is not limited to one shown in FIG. 3, and the job ticket generation unit 103 may generate a job ticket describing processing content that would be necessary for the next processing step. In S1503, the workflow execution unit 104 determines whether to end the workflow. If no activity is to be executed, the workflow execution unit 104 determines "yes", and the process ends.

In S1504, the workflow execution unit 104 commences executing the next activity. For example, a device that executes processing in each activity may add information representing the end of the processing on a per activity basis, when describing the processing result, such as the job ticket 401 in FIG. 5. When only two pieces of information are described for five processing steps, each representing the end of processing of an activity, then the workflow execution unit 104 determines that the next activity is the third step. Concrete processing in S1504 is to generate a job ticket that describes content to be processed by a device in charge of an activity that has been determined to be next to be executed. In S1505, the workflow execution unit 104 selects a PC, device, or the like for executing an activity that commences in S1504. The workflow execution unit 104 transmits a job ticket that describes processing content from the document reception application 109 to a PC or device such as the near-line finisher 112, and instructs the PC or device to execute processing. In S1506, the workflow execution unit 104 waits for the processing result from the PC or device, and keeps waiting for the processing notification. The workflow execution unit 104 receives the processing status of a processing step of interest among a plurality of processing steps from a device, also called a job processing apparatus, which executes processing in the processing step of interest. In S1507, the workflow execution unit 104 receives the processing result notification from the PC or device, and analyzes the processing result. More specifically, a device or the like for each processing step describes the processing result in the job ticket, as shown in FIG. 5. The workflow execution unit 104 can analyze the processing result by referring to the job ticket acquired from the device for each processing step. In S1508, the workflow execution unit 104 reconstructs the job ticket. More specifically, as shown in FIG. 5, the workflow execution unit 104 adds information of each step to the job ticket shown in FIG. 3, in accordance with the processing result that is transmitted from the device in charge of activity processing.

In S1509, the workflow execution unit 104 determines whether the result analyzed in S1507 is normal. The workflow execution unit 104 determines whether an unprocessed part remains in a job ticket that has been received from a device in charge of processing of each activity, and describes the processing result. If the workflow execution unit 104 determines that no unprocessed part remains, it determines that the analyzed result is normal, and the workflow execution unit 104 advances the process to S1503. If the workflow execution unit 104 determines in S1509 that an unprocessed part remains, it determines that the analyzed result is abnormal, and the process advances to S1510. In S1510, the workflow execution unit 104 determines whether the job can partially continue. That is, in S1510, the workflow execution unit 104 determines whether the processing status of the processing step of interest received in S1506 satisfies the job ticket division condition. The workflow execution unit 104 recognizes processed and unprocessed parts of the print job on the basis of the processing status received in S1506. If a processed part, such as a printed part, exists upon abnormal interruption, the workflow execution unit 104 determines whether the job can partially proceed to the next step. The job ticket division condition is information representing an event in which the received processing status of the processing step of interest interrupts processing in the processing step of interest.

More specifically, the determination is based on order information and the processing content of the next step. For example, the job ticket 401 in FIG. 5 represents execution of wrapping and binding 10 copies of 12 sheets each. In the printing processing step, up to 50 pages have been printed, and four copies of 12 sheets each can be wrapped and bound in the next step. If it is determined, however, that the number of printed pages is 6, no case binding can be executed in the next step, because the unit of case binding is 12 sheets. In this case, the workflow execution unit 104 determines in S1510 that no job can continue. An event which generates an odd part that is less than the processing unit in a step adjacent to the processing step of interest is also referred to as an event which leaves an unprocessed part, and which will be described later.

In S1511, the workflow execution unit 104 waits for cancellation of an abnormality when determining in S1509 that the analyzed result is abnormal. Upon canceling the abnormality, the process advances to S1512 to perform processing after abnormality cancellation. More specifically, when receiving abnormality cancellation information, the workflow execution unit 104 generates and issues a job ticket describing processing content after the abnormality cancellation. Steps S1311 to S1314 are an application of S1511 and S1512 to engine processing A3. In S1513, the workflow execution unit 104 performs continuation processing. Continuation processing generates and issues the job ticket of the next step for the part that is determined in S1510 as being available to continue. That is, the workflow execution unit 104 generates the first job ticket that describes the processing parameters of the processed part for the next step, in order to process in the next step the processed part recognized in S1510. The workflow execution unit 104 delivers the generated first job ticket to a device that executes processing in the next step. Continuation processing is also executed for the successive processes. When an event which leaves an unprocessed part occurs in the processing step of interest, the workflow execution unit 104 generates, by dividing, the first job ticket that describes the processing parameters for the next step, in accordance with the processing status of the processing step of interest, so as to deliver the processed part to the next step. An example of the event which leaves an unprocessed part is an error in the printing step.

The workflow execution unit 104 generates, by dividing, the second job ticket, corresponding to the job ticket 402 in FIG. 6, which describes the processing parameters of the unprocessed part for the processing step of interest, so as to process the unprocessed part in the processing step of interest. The workflow execution unit 104 partially executes processing and waits for the completion of the unprocessed part, as shown in S1304-S1310 of FIG. 13.

In the flowchart of FIG. 15, it is determined whether continuation processing is possible, when workflow processing does not end normally. If it is determined that continuation processing is possible, the part for which processing is possible is continuously processed, and the part for which processing is not possible is processed after the abnormality is canceled. Hence, processing can proceed efficiently. In the present example, the server comprising the workflow execution unit 104 generates a job ticket, and uses the job ticket to instruct a personal computer or device to execute an activity. However, an arrangement having no server can also divide and transmit a job ticket in cooperation with a device, a PC, or the like. While the present specification exemplifies an error occurring in a printer, the present invention is also applicable to a processing error other than an error occurring in a printer. It is presumed that the near-line finisher is a binding unit that possesses the stapling function, and the staples therein run short. In this case, processing can efficiently proceed by performing the next step for stapled copies and generating a job ticket for an unprocessed part.

Processing by the workflow execution unit 104 will be described in detail with reference to FIG. 13, by exemplifying the printing step. Per the foregoing, FIG. 13 corresponds to a part of the processing in FIG. 15. The entire processing in FIG. 13 corresponds to steps S1504-S1513 in FIG. 15. The process in FIG. 13 exemplifies the printing step of the processing step 203, and commences at the start of the printing step. The process also applies to another processing step. Note that "all printed?" in steps S1313 and S1309 of FIG. 13 should be replaced with determination of whether processing in each processing step is complete. The determinations in step S1302 and S1303 are based on different criteria for each processing step.

Figure 13:
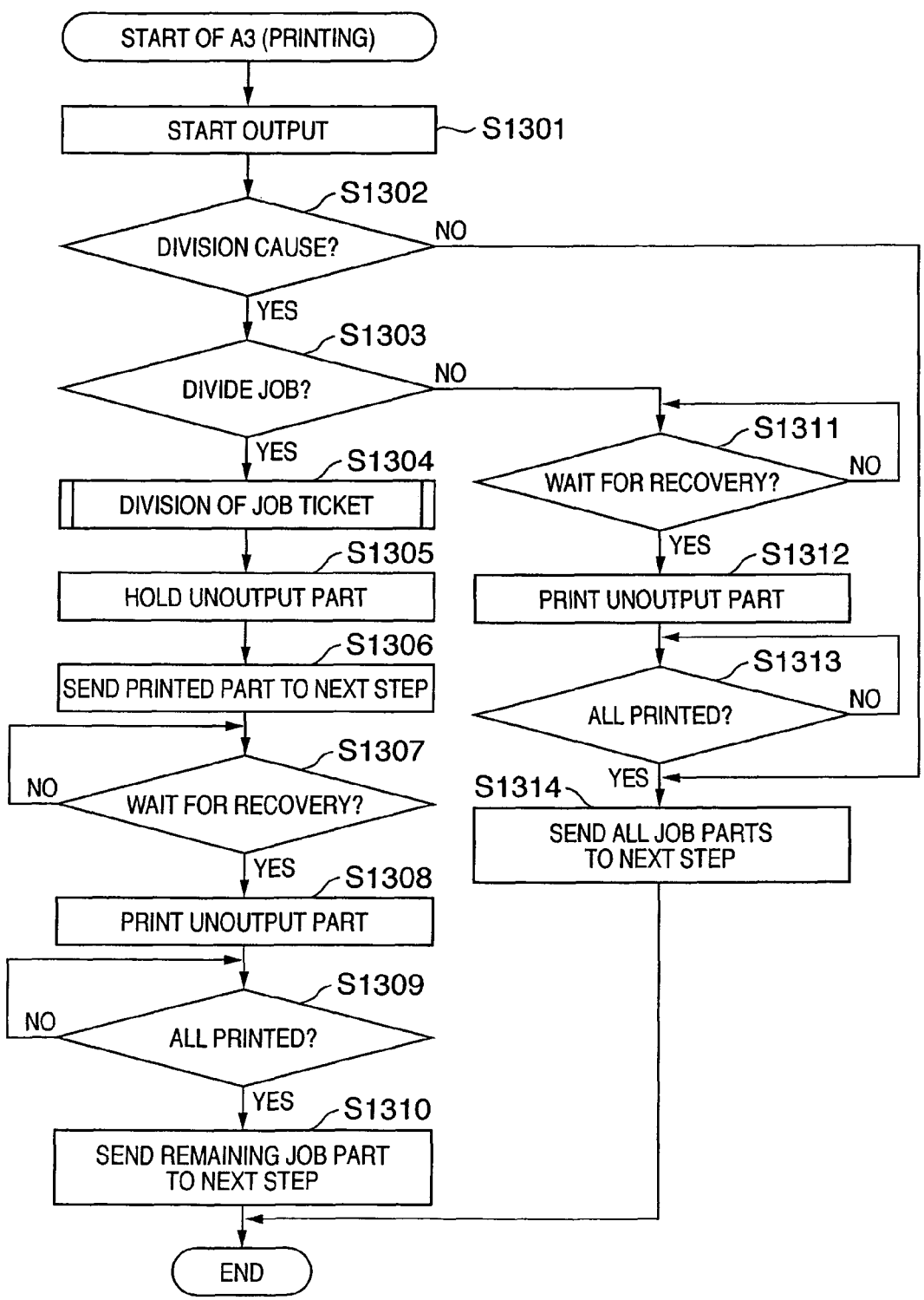
FIG. 13 is a flowchart of processing by a workflow execution unit.

In step S1301 of FIG. 13, the workflow execution unit 104 asks output to the print engine 111. More specifically, in step S1301, the workflow execution unit 104 generates a job ticket, except for the descriptions of the processing results 504 to 506 of step A3 in the job ticket 401 of FIG. 5, and transmits the job ticket to the print engine 111. An instruction to the print engine 111 is described in accordance with the processing result of the preceding processing step A2. For example, the output size in processing step A2 is A3, the number of sheets is 120, and double-sided imposition is set. The workflow execution unit reads items contained in the processing result of the processing step A2, among the parameters necessary for printing, and writes the read items as the parameters of the processing step A3 in the job ticket. The MIS 210 may deliver print data. Although not shown in FIG. 5, the job ticket may describe the location and file name of print data as the processing result of step A2, and the workflow execution unit 104 may describe the data location in the job ticket by referring to the processing result of step A2.

The workflow execution unit 104 receives a job ticket that is sent back from the engine unit 111. In step S1302, the workflow execution unit 104 refers to the job ticket to determine whether or not a circumstance has arisen that would cause a job to be divided. The determination whether or not a circumstance has arisen that would cause a job to be divided is made for each step in progress, i.e., each processing step of interest. In general, when an event occurs that stops a job in progress, i.e., a workflow, the workflow execution unit 104 determines that the event is cause to divide the job. For example, in the printing processing step, the workflow execution unit 104 determines whether any problem, such as a fault, has occurred in the print engine 111. In other words, the workflow execution unit 104 determines whether or not the processing result described in the received job ticket contains a job remaining to be output. For example, in the post-processing step, the workflow execution unit 104 determines, from the number of output pages described in the received job ticket, whether all pages that constitute a unit, e.g., one copy, of post-processing are prepared. If a part, i.e., pages, less than the unit of post-processing exists, the workflow execution unit 104 determines that this part must be separated into an independent job. If the workflow execution unit 104 determines that a cause for dividing is present, e.g., a problem has occurred in the print engine 111, the process advances to step S1303 to determine whether to divide the job. If no cause for dividing has occurred, the process advances to step S1314.

When a cause for dividing is present, the workflow execution unit 104 determines in step S1303 whether or not dividing is appropriate to the job of interest. For example, when the cause for dividing is an engine fault, the determination is made automatically, in accordance with factors that may include, but are not limited to, "the number of printed pages", "the ratio at which printed pages occupy all pages", "type of post-processing", or "the type of engine fault. In an example of wrapping and binding 10 copies of 12 printed sheets each, if step A3 is normally complete when transferring sheets from printing to bookbinding, 120 printed sheets are output. When only the first 15 sheets are printed, they are transferred to the bookbinding step and bound into one copy. That is, the job can be divided. If, however, only the first nine sheets are output, they cannot be bound. That is, job cannot be divided. In this case, even if the job is divided, no processing can be executed in the next post-processing step, and thus, it is determined that no job need be divided. In so doing, the workflow execution unit 104 determines in step S1303 whether or not the job needs to be divided, on the basis of the processing result information described in the job ticket.

Examples of the determination criteria in step S1303 are as follows:

(1) The number of printed pages: whether or not at least one processing unit (12 sheets in the above example) of a post-step, e.g., finishing step is prepared. If even one processing unit is not prepared, the job is not divided. The present condition refers not only to the number of pages, but also to the fact that printed pages include the start and final pages.

(2) The ratio of printed pages: whether or not the number of outputted pages is equal to or larger than a predetermined ratio to the number of pages to be output. If the number of outputted pages is smaller than the predetermined ratio, the job is not divided. For example, when job dividing can be designated by the ratio such that work in the next step can commence if 10% or more of all pages are outputted, an assessment is made to determine whether or not pages equivalent to the ratio have been output.

(3) The type of post-processing: for example, when the next post-processing step is boxing of all pages, it is useless to deliver printed pages unless all pages are prepared. An assessment is made to determine whether or not the type of post-processing is significant, even when the job is divided.

(4) Engine fault: for example, when the next step is bookbinding but the bookbinding apparatus is in trouble and no substitute exists, division is useless because processing does not proceed even upon job division. An assessment is made to determine whether or not a substitute engine is present after dividing.

The criteria are examples of the determination criteria in printing processing. For example, the determination criteria are made into a table, saved in the memory or the like, and referred to. The determination criteria may be set in advance, by an operator or the like.

If the workflow execution unit 104 determines that the job is to be divided, the process advances to step S1304. In step S1304, the workflow execution unit 104 divides the job ticket of the original job into the job ticket of a job which is to proceed to the next step, and the job ticket, e.g., FIG. 6 of a job which stays in a step suffering the cause for dividing. In other words, the workflow execution unit 104 creates a job ticket for a processed part, and a job ticket for an unprocessed part, in accordance with the job ticket that is received from a device, and describes the processing result.

In step S1305, the job of the part remaining to be output is suspended in a state in which printing can start upon engine recovery. The workflow execution unit 104 saves the divided job ticket corresponding to the part remaining to be output in the job ticket management unit 105, and waits for engine recovery. In step S1306, the workflow execution unit 104 receives the job ticket from the print engine 111, upon completion of the job corresponding to the printed part of the divided jobs. The workflow execution unit 104 generates the job ticket 403 for the next processing step A4, and transmits it to the execution entity of step A4, e.g., the finisher 112. The process shifts to the finishing processing step. Upon reception of the job ticket, the finisher 112 executes post-processing in accordance with the parameters described for step A4.

In step S1307, the process waits for engine recovery. After engine recovery, the process advances to step S1308, and the workflow execution unit 104 transmits the job ticket 402 that was suspended in step S1305 to the print engine 111. The workflow execution unit 104 receives engine status information. If the workflow execution unit 104 determines recovery from the engine status information, it extracts the job ticket 402 for the part remaining to be output from the job ticket management unit, and transmits the job ticket 402. As a result, the suspended print job for the part remaining to be output commences. Although steps S1307 and S1308 are positioned immediately after step S1306 for descriptive convenience, they may be executed asynchronously. In step S1309, the workflow execution unit 104 determines whether all pages have been printed.

In step S1310, the job processed in step S1308 advances to the post-processing (A4) step. More specifically, the workflow execution unit 104 receives a job ticket that describes the processing result from the print engine upon completion of printing in step S1308. The job ticket generation unit 103 generates a job ticket (not shown in FIG. 4) for the post-processing (A4) step, in accordance with the workflow and the received job ticket. The workflow execution unit 104 transmits the generated job ticket to the finisher 112, which executes the post-processing step.

In step S1311, if the workflow execution unit 104 determines that the job is not to be divided, it waits for cancellation of the cause that has stopped the job, e.g., for engine recovery. After the engine recovers, the process advances to step S1312 to print the part remaining to be output. The print engine 111 may wait for recovery without sending back any job ticket to the workflow execution unit 104. Alternatively, if a fault occurs, the print engine 111 may stop processing and transmit a job ticket describing processed and unprocessed parts as the processing result, to the workflow execution unit 104. In this case, the workflow execution unit 104 transmits a job ticket which designates the printing processing step, to the print engine 111, after recovery from the fault. The transmitted job ticket has the same content as that of the job ticket received from the print engine 111. The print engine 111 refers to the parameters of processing step A3 described in the received job ticket, skips pages corresponding to output pages, and prints a part corresponding to job remaining to be output.

In step S1313, the workflow execution unit 104 determines whether all pages have been printed. If printing ends, the process advances to step S1314 to combine the jobs, and advances to step A4. Also at this time, the job ticket generation unit 103 creates a job ticket describing the parameters of the entire job for post-processing step A4, and transmits the job ticket to the finisher 112.

Figure 18:
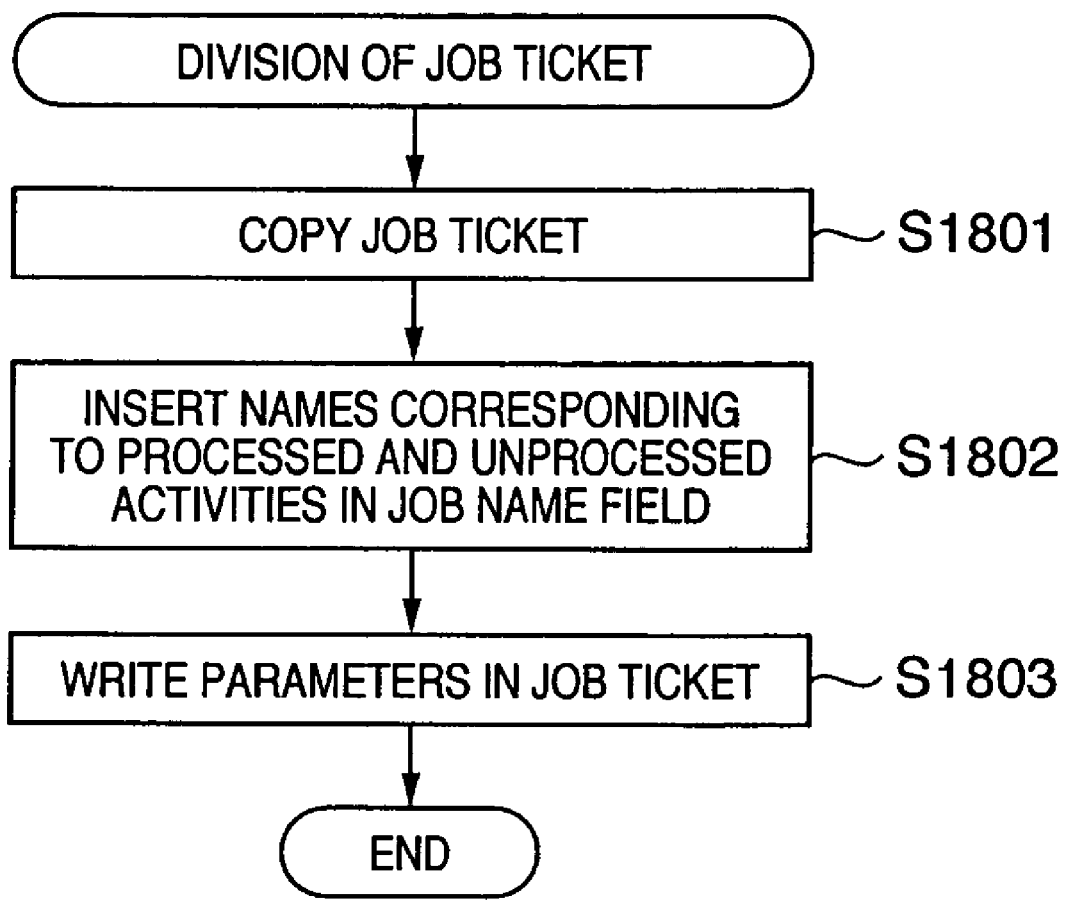
FIG. 18 is a flowchart of job dividing procedures.

FIG. 18 shows an example of job ticket division processing. The job ticket generation unit 103 copies the job ticket of an original job by the division count, per S1801. The job ticket generation unit 103 copies the original job name to the original job fields of respective job tickets, and describes names unique to the respective job tickets as job names according to the rule described with reference to FIG. 5 and the like, per S1802. After that, the job ticket generation unit 103 describes instructions, i.e., processing parameters in the fields of corresponding steps for devices that are to receive the respective job tickets.

Merging of Job Tickets

FIGS. 10A to 10D are views of examples of the panel display when merging job tickets. A job ticket processing program running in each device provides the display in question. For example, when an operator inputs a job merge instruction, the device displays a window 1001 in FIG. 10A, in accordance with the instruction. The display device is, e.g., the near-line finisher 112. Any device for merging jobs can present the same display.

The window 1001 is an example of a job ticket input instruction window. A display area 1005 displays a message from the system. An area 1006 is a text input area for causing a user to input a job ticket to be merged. A button 1007 is a reference button that is used to refer to and search for a job ticket. For example, the storage means of the device stores a job ticket transmitted from the workflow execution unit 104. The user can press the reference button 1007 to display a stored job ticket information list. By pressing the reference button, job ticket information may be acquired from the MIS and displayed. A button 1008 is an execution button for executing a job ticket merge. A button 1009 is a merge button for designating the second and subsequent job tickets to be merged. A button 1010 is a cancel button for returning from the job ticket merge display.

Figure 10C:
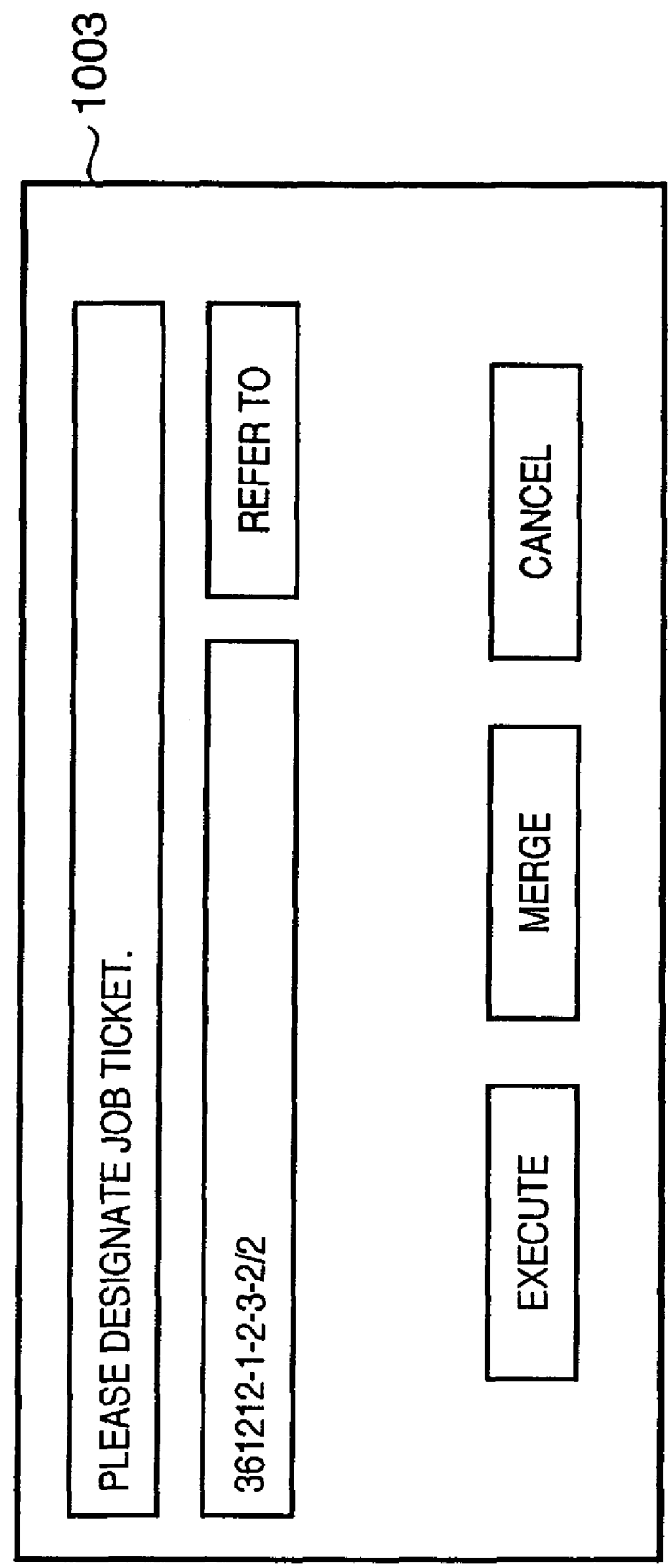
FIG. 10C is a view of an example of a panel display when merging job tickets.

A window 1002 in FIG. 10B is a display state when the user designates the first job ticket name. In this state, the user can press the merge button. After pressing the merge button, the user can input the second job ticket name. A window 1003 in FIG. 10C is a window when the user designates the second job ticket name. In this state, the user can press the execution button. After pressing the execution button, the user can input a password. A window 1004 in FIG. 10D is a display state when the user inputs a merge password, i.e., tally password, and presses the execution button. When the user presses the execution button in the window 1004, the workflow execution unit 104 receives information which is input through the windows of FIGS. 10A-10D, and includes the names of job tickets to be merged and the like. The workflow execution unit 104 merges the designated job tickets in accordance with the procedures of FIG. 14.

Figure 12:
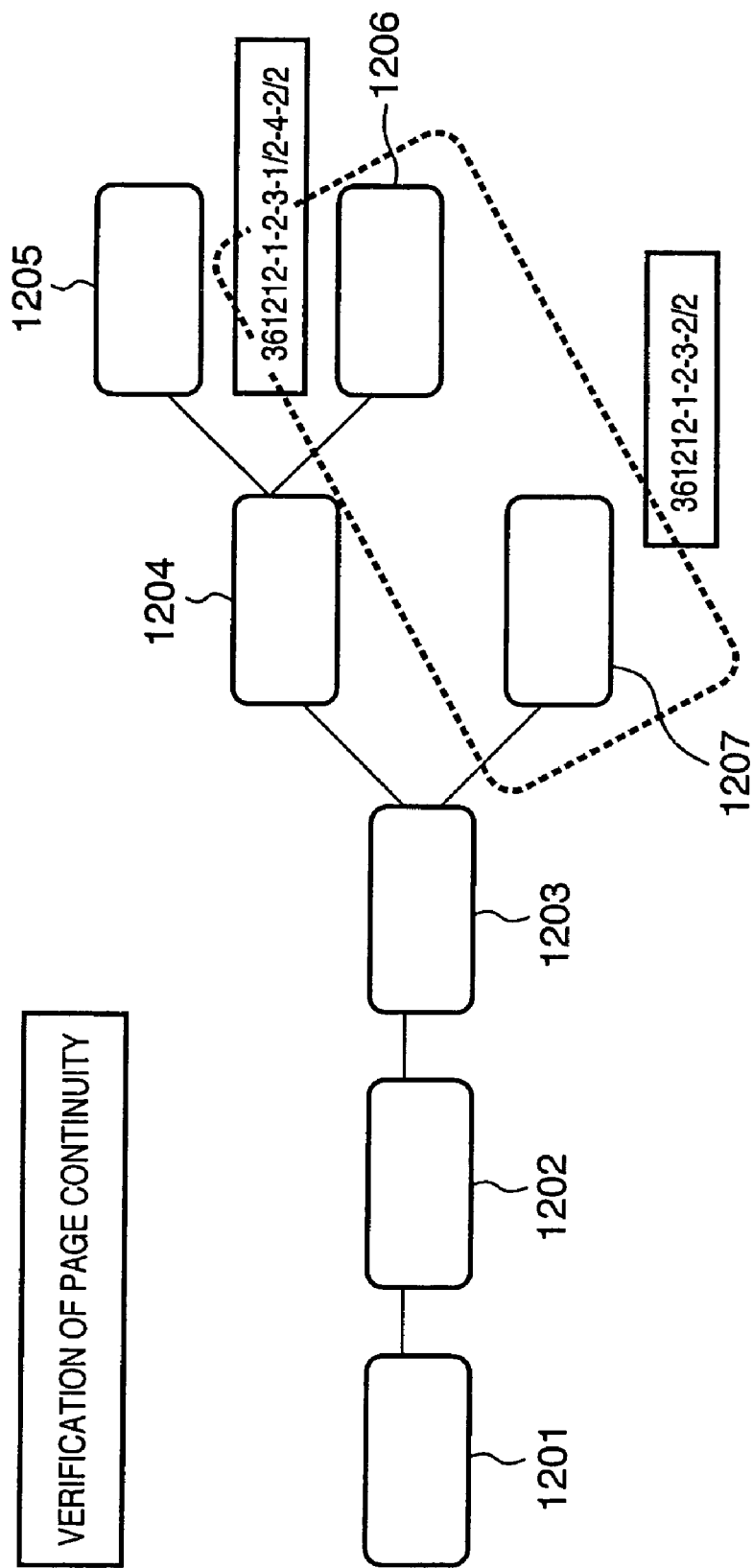
FIG. 12 is a view showing a transition of the job ticket.

FIG. 12 is a view showing an example of job tickets generated for respective processing steps. A job ticket 1201 executes work step A1 in this example, and a job ticket 1202 executes step A2. Since no dividing occurs, the number of job tickets is one. The workflow advances to step A3, in which dividing occurs. This means that the job ticket 206 is divided into the job tickets 401 and 402. In FIG. 12, a job ticket 1203 is divided into job tickets 1204 and 1207. The job ticket 1204 is further divided into job tickets 1205 and 1206. The job ticket 1206 represents the job ticket 704. In FIG. 12, the job ticket 1206 describes 361212-1-2-3-1/2-4-2/2. The job ticket 1206 represents that the job ticket name is "361212", and the job corresponds to the former half of the third step and the latter half of the fourth step. The job ticket 1207 describes 361212-1-2-3-2/2. The job ticket 1207 represents that the job ticket name is "361212", and the job corresponds to the latter half of the third step. Hence, jobs corresponding to the job tickets 1206 and 1207 have page continuity, and thus, the job tickets 1206 and 1207 can merge with each other. This will be explained in more detail with reference to FIG. 19.

Figure 19:
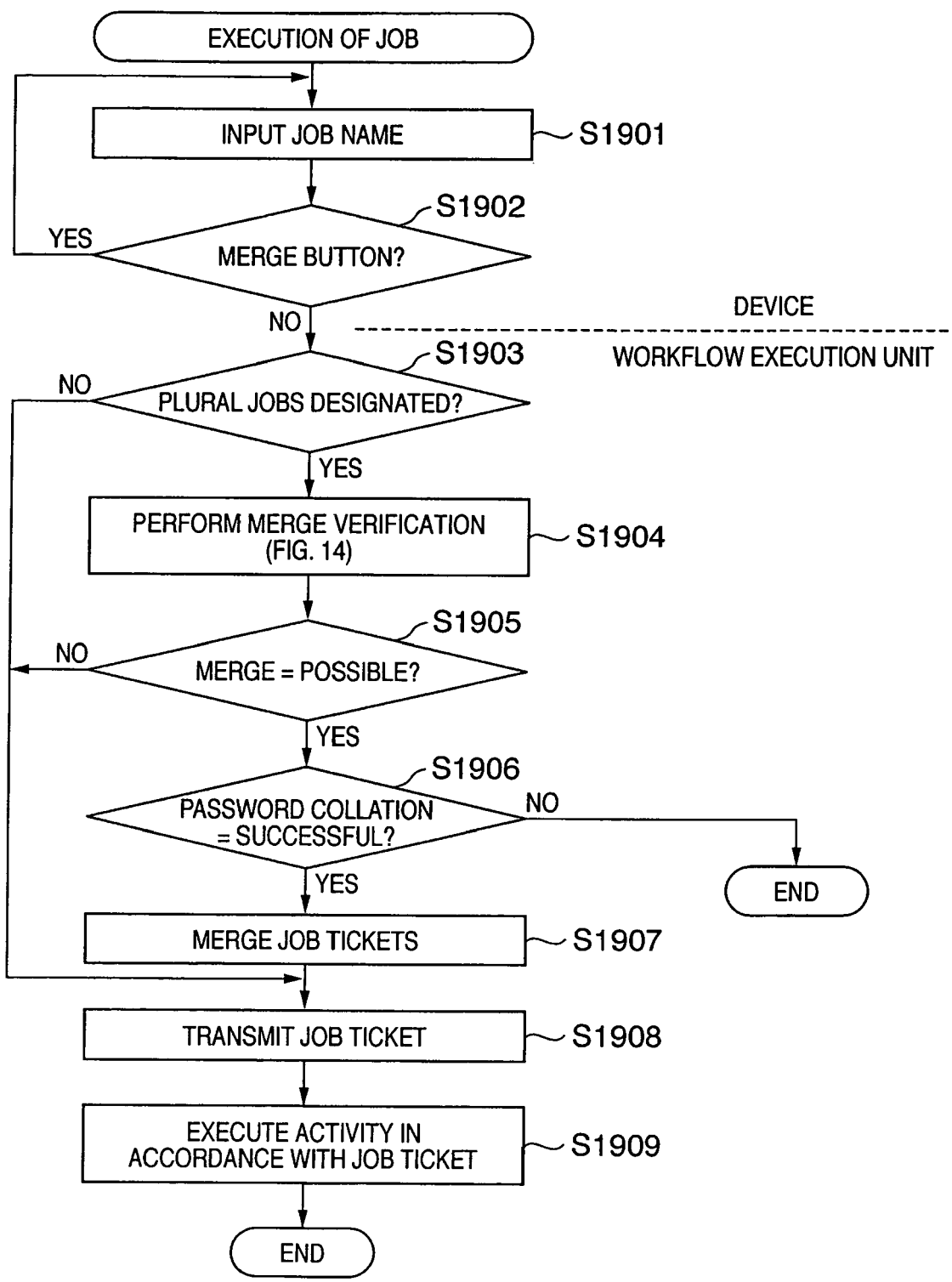
FIG. 19 is a flowchart of execution of activities by a device and workflow execution unit.

FIG. 19 shows procedures for merging job tickets for a given activity, and then execute the activity. In FIG. 19, a device such as a finisher performs steps S1901 and S1902, and the workflow execution unit performs step S1903 and subsequent steps. The device recognizes a target job name input through the user interfaces of FIGS. 10A-10D, per step S1901. To perform a merge, a user presses the merge button to instruct the device regarding merge processing, and the device recognizes input job ticket names to be merged, per step S1902.

The workflow execution unit 104 receives parameters input by the device. The workflow execution unit determines whether or not a plurality of job names have been designated, per step S1903. If the number of designated job names is one, the job ticket generation unit 103 writes the parameters of device processing in a job ticket corresponding to the designated job. The workflow execution unit 104 transmits the job ticket to the device, per step S1908.

If a plurality of job tickets have been designated, the workflow execution unit 104 performs merge verification processing, per step S1904. Merge verification processing determines job name coincidence and page continuity, as per the foregoing. Details of the merge verification processing will be described with reference to FIG. 14. The workflow execution unit 104 determines whether the job tickets can merge with each other, per step S1905. If the jobs can merge with each other, the workflow execution unit 104 collates the tally passwords that it has received, together with the job ticket names with those described in the job tickets to be merged, per step S1906. That is, in S1905, the workflow execution unit 104 describes passwords in a job ticket based on the job ticket advancing from the processing step of interest, and a job ticket in the processing step of interest associated with an unprocessed part. In merging job tickets, the workflow execution unit 104 determines whether or not they can merge with each other, in accordance with the passwords.

If the collation is successful, the workflow execution unit 104 merges the designated job tickets in step S1907. More specifically, the workflow execution unit 104 describes the job name of the second job ticket to be merged as the subjob name of the first job ticket to be merged. The workflow execution unit 104 describes the parameters of the next step in the merged job ticket. In step S1908, the workflow execution unit 104 transmits the merged job ticket to a device that executes the next step. Finally, the device executes processing, per S1909.

If the collation fails in step S1906, the merge processing ends. The workflow execution unit 104 may notify the device that executed the merge that merging of the job tickets failed.

More specifically, for the purpose of processes in steps adjacent and subsequent to the processing step of interest, the workflow execution unit 104 merges a job ticket associated with an unprocessed part of a print job with a job ticket based on a job ticket proceeding to the next step upon completion of processing the unprocessed part in the processing step of interest.

Figure 14:
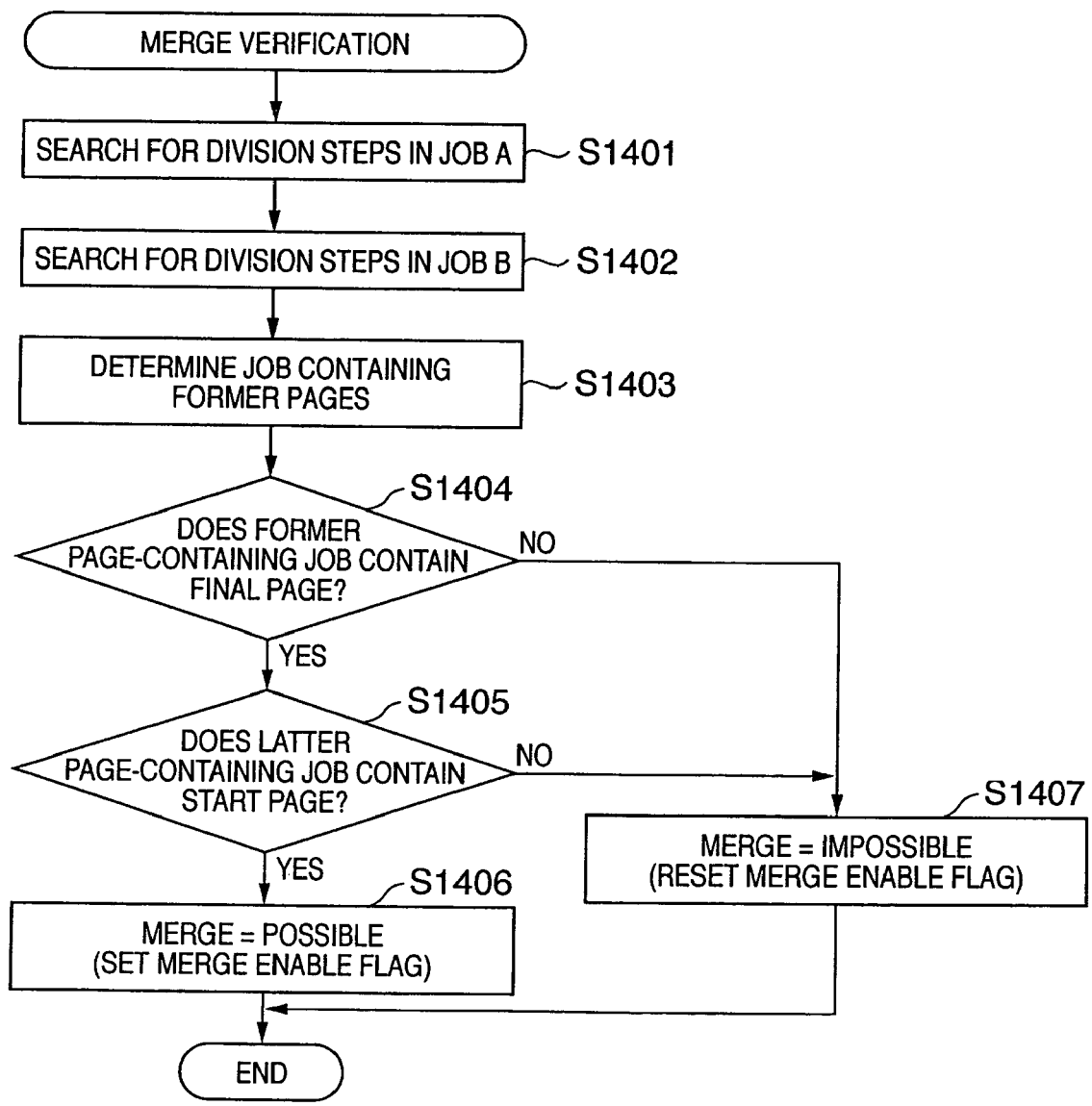
FIG. 14 is a flowchart of determining whether or not a job ticket may be merged.

FIG. 14 is a flowchart for assessing whether a job ticket merge is possible or not, per S1904. The workflow execution unit 104 executes the process in FIG. 14 in accordance with the parameters input from the user interfaces of FIGS. 10A-10D. In FIG. 14, it is determined whether or not, for example, the job tickets of two jobs A and B can merge with each other.

It can also be determined whether or not the job tickets of three or more job tickets can merge with each other.

In step S1401, the workflow execution unit 104 searches for dividing steps in the job A, as designated by a user. The dividing steps are steps 3 and 4 in FIG. 11. The dividing step can be detected from an input job name. It can be determined whether or not a step preceding a fractional identifier such as "1/2" in the job name is a division step. For example, when the input name is "−3-1/2", the workflow execution unit 104 recognizes that the third step is a division step. In step S1402, the workflow execution unit 104 searches for division steps in job B. The search method is the same as that in S1401. In step S1403, the workflow execution unit 104 determines a job containing former pages. For example, the workflow execution unit 104 executes determination using values described as the numerators of fractional identifiers described after the same division step detected in S1401 and S1402. That is, the workflow execution unit 104 determines fractional identifiers described after the third step. If the step is divided, the workflow execution unit 104 assesses a job containing former pages and a job containing latter pages. At this time, the workflow execution unit 104 determines, as a former page-containing job, a job of a job name in which the numerator of the fractional identifier subsequent to the division step is 1. In other words, the numerator value of the fraction represents the job ticket order. For example, the job ticket 1206 contains former pages from the job tickets 1206 and 1207 in FIG. 12. It can be determined from the job name that the job ticket 1206 contains the former pages that were divided in step A3.

In step S1404, the workflow execution unit 104 determines whether or not the job that was determined in step S1403 to contain the former pages contains the final page, upon dividing. In the example of the job tickets 1206 and 1207, the workflow execution unit determines, from the job ticket 1206, whether or not the job ticket 1206 contains the final page of the former pages, i.e., the final page of processed pages, upon dividing of the third step. In step S1405, the workflow execution unit 104 determines whether or not the job that was determined in step S1403 to contain the latter pages contains the start page, upon dividing. The workflow execution unit determines, from the job ticket 1207 of the job tickets 1206 and 1207, whether or not the job ticket 1207 contains the start page of the latter pages, i.e., the start page of the unprocessed pages, upon dividing of the third step.

The workflow execution unit 104 determines in step S1406 that merge is possible, and in S1407 that merge is impossible. If both steps S1404 and S1405 are Yes, the workflow execution unit 104 determines that the former page-containing job and the latter page-containing job have page continuity. Hence, the workflow execution unit determines that a plurality of job tickets designated through the UIs of FIGS. 10A-10D can merge with each other, per S1406. That is, when merging job tickets, the workflow execution unit 104 determines whether or not processing parts by job tickets to be merged in steps adjacent and subsequent to the processing step of interest in which the job ticket is divided are continuous. If the processing parts are continuous, the workflow execution unit 104 merges the job tickets. For example, a flag representing that merging is possible is set in step S1406 and reset in step S1407. The flag serves as a determination criterion in step S1905 of FIG. 19.

Although the present procedures show merging determination based on page continuity, page continuity alone is not always the merge condition. Even merging without any page continuity may not influence the succeeding work.

The embodiment can dynamically divide a job ticket during execution of the workflow. Activities are executable using divided job tickets. For example, even if an event which interrupts workflow processing occurs during execution of one job, processing that may be continued can proceed by dividing the job ticket. Unlike the prior art, no job that may be processed need be suspended until the interruption cause is canceled. The entire job process can proceed efficiently.

Job tickets can dynamically merge with each other during execution of the workflow. Activities are executable using the merged job ticket. When divided jobs must synchronize with each other, a plurality of jobs merge with each other and proceed as a single job. The embodiment can prevent a loss of time that would be caused by the stop of the workflow, as well as omit processes, and increase workflow productivity.

When an operator manually merges outputted materials concerning divided jobs, subsequent steps must be processed as a merged job. However, the server cannot recognize that outputted materials are merged, unless otherwise notified. Thus, the operator who merged the outputted materials in the manual work step notifies the workflow execution unit through a personal computer or the like of the name, i.e., the job ticket name, of a step of outputting merged outputted materials and that he merged the outputted materials. Upon reception of the notification, the workflow execution unit merges the job tickets corresponding to the merged outputted materials, thus generating the job ticket of the next step. As a result, manual merge can be reflected in the workflow to simplify work.

Second Embodiment

In the first embodiment, the workflow execution unit 104 sends a job ticket to a device which executes each activity, and receives a job ticket containing the processing result from the device. The workflow execution unit 104 executes all the division and merge of job tickets.

To the contrary, in the second embodiment, a workflow execution unit 104 delivers a job ticket to a device which executes the first activity. Then, the job ticket is chain-delivered from one device to another in respective steps. For this purpose, the job ticket describes instructions (parameters) for all steps in advance. Every time a step ends, the processing result is described. That is, the entity in the second embodiment is a job processing apparatus which executes a predetermined processing step on the basis of a job ticket defining the processing parameters and processing order of processing steps. Examples of the job processing apparatus are a print engine 111 and near-line finisher 112, but are not limited to them. A device (job control apparatus) in the second embodiment has the same functions as those of a server 100 in FIG. 1. The processing parameters mean the contents of processing by a device which receives a job ticket. For example, parameters in the printing step include a concrete numerical value (e.g., five copies each of 10 pages), in addition to print settings (e.g., double-sided printing).

FIG. 16 shows an example of a workflow in the second embodiment. A job ticket 206 input from a server 210 to a device 201 is delivered from one device to another in the order described in the job ticket 206. Each device executes an activity. The job ticket finally returns to, e.g., the workflow execution unit, which confirms the completion of the job ticket.

Figure 20:
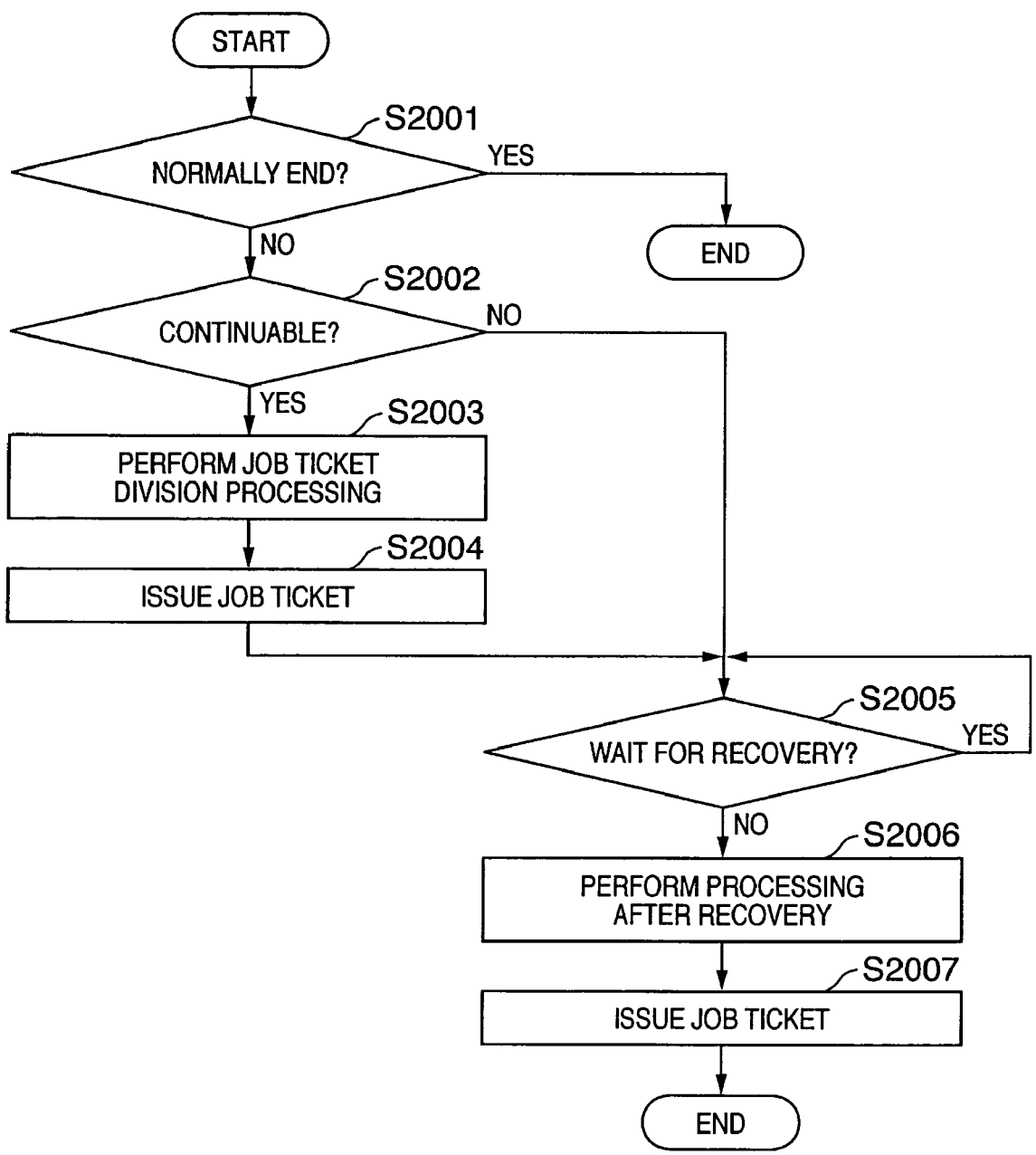
FIG. 20 is a flowchart pertaining to the workflow execution unit of a device according to the second embodiment.

Processing in the second embodiment will be explained with reference to FIG. 20. The processing unit of each device executes processing in FIG. 20. In the second embodiment, the device holds the workflow execution unit 104.

When receiving a job ticket, the workflow execution unit 104 of each device recognizes, from contents defined in the job ticket, the processing contents of a processing step of interest to be executed by the device. The workflow execution unit 104 of the device analyzes the status of processing based on the recognized processing contents, and determines whether processing of the target activity normally ends. More specifically, the workflow execution unit 104 of the device determines whether the device in charge completes target processing. For example, in the printing step, the job ticket describes information on the number of pages to be printed. The workflow execution unit 104 of the device executes determination in S2001 by comparing this described information with the number of actually output pages.

If the workflow execution unit 104 of the device determines in S2001 that processing does not normally end, it detects a processed part, advances to the next step, and determines whether processing can continue (S2002). More specifically, the job ticket describes contents to be processed in the next step. Based on this information, the workflow execution unit 104 of the device executes the same processing as that in S1510 of FIG. 15. If necessary, the workflow execution unit 104 of the device may communicate with the server 100 to acquire information necessary for determination in S2002. If the workflow execution unit 104 of the device determines in S2002 that the above-mentioned processing status satisfies a predetermined condition, it identifies processed and unprocessed parts of the print job on the basis of the processing status. The workflow execution unit 104 of the device executes determination processing in S2002 using information on the identified processing status.

If the workflow execution unit 104 of the device determines in S2002 that processing can continue, it divides the job ticket into a job ticket related to a job which advances to the next step, and a job ticket related to a job which has not been processed and is to be processed in the current step (S2003). The workflow execution unit 104 of the device creates a job ticket by changing the job ticket received from the preceding step into information that the processing contents of steps subsequent to the current step are to be executed for the processed part. Further, the workflow execution unit 104 of the device creates a job ticket by changing the job ticket received from the preceding step into information that the processing contents of the current and subsequent steps are to be executed for the unprocessed part. That is, the workflow execution unit 104 generates the first job ticket describing the processing parameters of the processed part for the next step in order to process the processed part in the next step.

The workflow execution unit 104 of the device issues, of the job tickets divided in S2003, a job ticket for the next step to a device in charge of the next step (S2004). That is, the workflow execution unit 104 of the device delivers the generated first job ticket to a device which executes processing in the next step.

If NO in S2002 or after processing in S2004, the workflow execution unit of the device waits for recovery (S2005). After recovery, the workflow execution unit of the device processes the unprocessed part, and issues, to the next step, a job ticket reflecting the processing on the unprocessed part. The unprocessed part is processed on the basis of the job ticket generated for the unprocessed part by the workflow execution unit 104 of the device. More specifically, when an event which leaves an unprocessed part occurs in the processing step of interest, the workflow execution unit of the device generates by division a job ticket describing processing parameters for the next step, on the basis of the processing status of the processing step of interest so as to deliver the processed part to the next step. The workflow execution unit of the device generates by division the second job ticket describing the processing parameters of the unprocessed part for the processing step of interest, so as to process the unprocessed part in the processing step of interest. The device executes processing in S2006 on the basis of the second job ticket.

Hence, the second embodiment can obtain the same effects as those of the first embodiment even for a chain workflow which proceeds by supplying one job ticket for one workflow. The workflow execution unit may be notified of generation of an interruption event and divide the job, similar to the first embodiment.

Since the functions of the workflow execution unit 104 of the device are basically the same as those in the first embodiment, the second embodiment has described only functions different from those in the first embodiment. However, the workflow execution unit 104 of the device can also execute functions (e.g., job ticket merge processing) described in the first embodiment.

As described above, the second embodiment can dynamically generate a new job ticket even during execution of the workflow in order to efficiently advance processing. Processing can efficiently proceed in accordance with its progress. Even when an event which stops the progress of a job occurs, a continuable part can be separated and proceed independently. If divided jobs need to synchronize with each other, a plurality of jobs can merge with each other and proceed as a single job. The second embodiment can suppress the time loss caused by the stop of the workflow and can omit processes.

Figure 22:
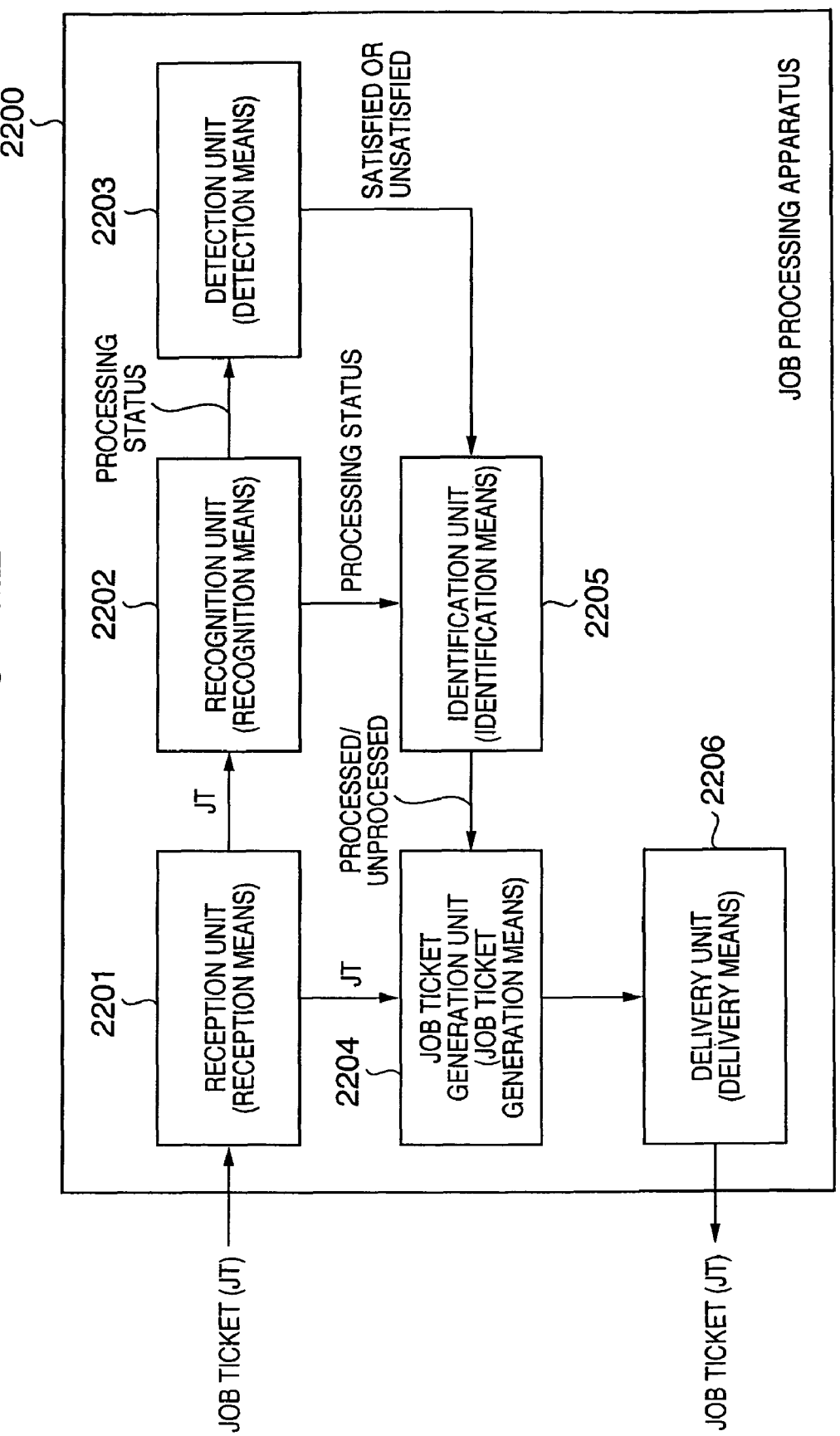
FIG. 22 is a block diagram corresponding to an invention according to claim 1.

FIG. 22 is a block diagram corresponding an invention according to claim 1. In FIG. 22, a job processing apparatus 2200 executes a processing step on the basis of a job ticket defining the processing parameters and processing order of processing steps. The job processing apparatus 2200 comprises a reception means 2201 for receiving the job ticket, a recognition means 2202 for recognizing the processing content of a processing step of interest that is defined in the job ticket received by the reception means 2201 and is to be executed by the job processing apparatus 2200, a detection means 2203 for detecting the status of processing recognized by the recognition means 2202, an identification means 2205 for, when the processing status detected by the detection means 2203 satisfies a job ticket division condition, identifying a processed part of a print job and an unprocessed part of the print job on the basis of the processing status, a job ticket generation means 2204 for generating the first job ticket describing the processing parameter of the processed part for the next step, in order to process the processed part identified by the identification means 2205 in the next step, and a delivery means 2206 for delivering the first job ticket generated by the job ticket generation means 2204 to a device which executes processing in the next step.

Figure 23:
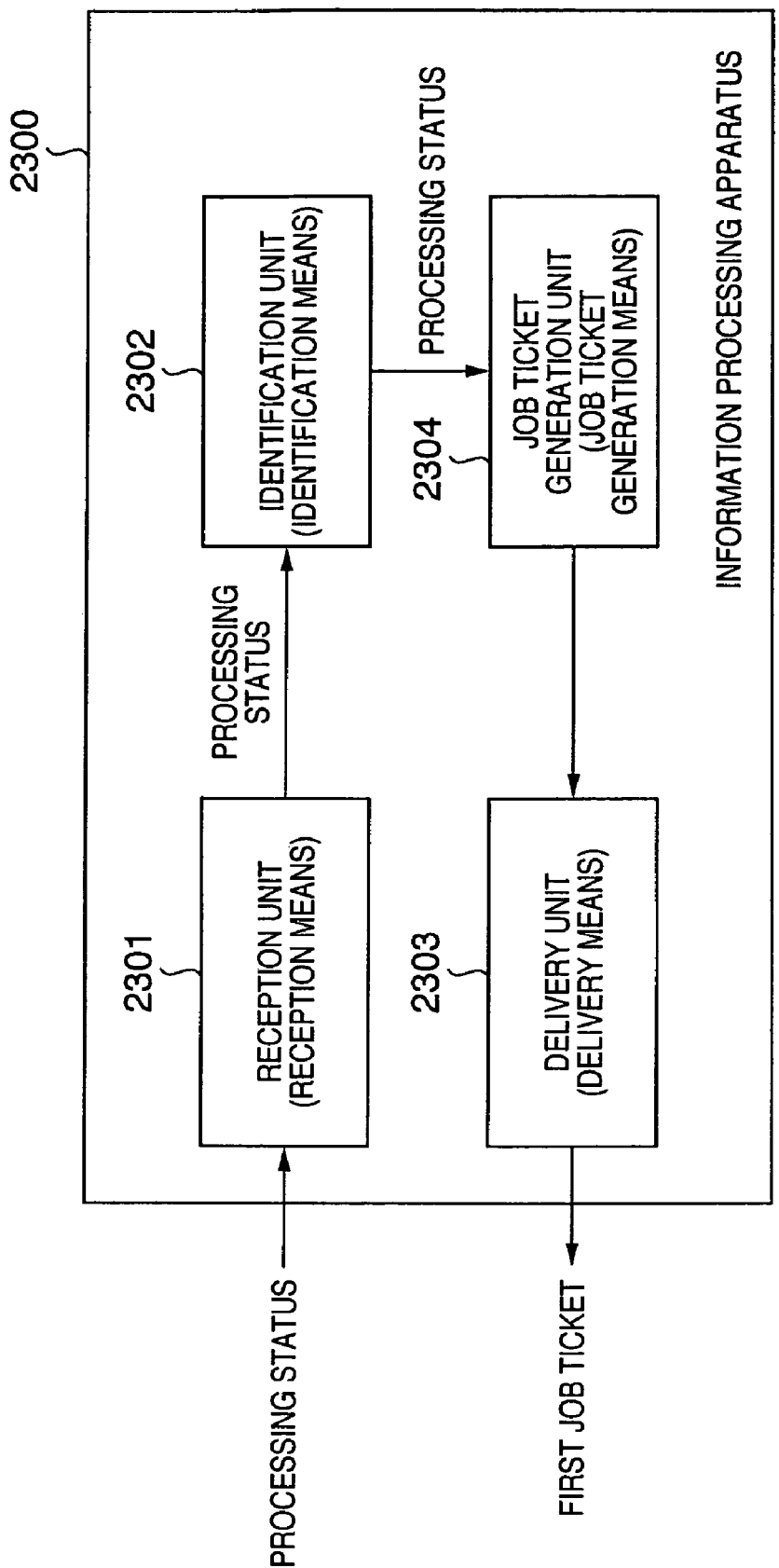
FIG. 23 is a block diagram corresponding to an invention according to claim 8.

FIG. 23 is a block diagram corresponding an invention according to claim 8. In FIG. 23, an information processing 2300 apparatus manages workflow information defining the processing order of processing steps and information on a device to execute each processing step, and generates a job ticket for executing a print job in accordance with the workflow information. The information processing apparatus 2300 comprises a reception means 2301 for receiving the processing status of a processing step of interest among the processing steps from a device which executes processing in the processing step of interest, an identification means 2302 for, when the processing status of the processing step of interest received by the reception means satisfies a job ticket division condition, identifying a processed part of the print job and an unprocessed part of the print job on the basis of the processing status, a job ticket generation means for generating the first job ticket describing the processing parameter of the processed part for a next step, in order to process the processed part identified by the identification means 2302 in the next step, and a delivery means 2303 for delivering the first job ticket generated by the job ticket generation means 2304 to a device which executes processing in the next step.

Other Embodiment

The present invention may be applied to a system including a plurality of devices (e.g., a host computer, interface device, reader, and printer) or an apparatus (e.g., a copying machine or facsimile apparatus) formed by a single device. The object of the present invention is also achieved by supplying a storage medium which stores program codes for implementing the functions of the above-described embodiments to a system or apparatus, and reading out and executing the program codes stored in the storage medium by the computer of the system or apparatus. In this case, the program codes read out from in the storage medium implement the functions of the embodiments, and the program codes and the storage medium which stores the program codes constitute the present invention.

The present invention includes a case where an OS (Operating System) or the like running on a computer performs some or all of actual processes on the basis of the instructions of the program codes and thereby implements the functions of the above-described embodiments. Further, the present invention also applies to a case where the program codes read out from the storage medium are written in the memory of a function expansion card inserted into the computer or the memory of a function expansion unit connected to the computer. In this case, the CPU of the function expansion card or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-359532, filed Dec. 13, 2005, which is hereby incorporated by reference herein in its entirety.

What is claimed is:

1. A job processing apparatus which executes a processing step on the basis of a job ticket defining processing parameters and a processing order of processing steps, comprising:
   a reception unit adapted to receive the job ticket;
   a recognition unit adapted to recognize a processing content of a processing step of interest that is defined in the job ticket received by the reception unit and is to be executed by the job processing apparatus;
   a detection unit adapted to detect a processing status of the process recognized by the recognition unit;
   an identification unit adapted to identify a processed part of a print job and an unprocessed part of the print job on the basis of the processing status, when the processing status detected by the detection unit satisfies a job ticket dividing condition;
   a job ticket generation unit adapted to generate a first job ticket that describes a processing parameter of the processed part for a next step, in order to process the processed part in the next step that has been identified by the identification unit; and a delivery unit adapted to deliver the first job ticket generated by the job ticket generation unit to a device which executes processing in the next step, wherein when an event which leaves an unprocessed part occurs in the processing step of interest, said job ticket generation unit generates by division the first job ticket describing a processing parameter for the next step, on the basis of the processing status of the processing step of interest so as to advance the processed part to the next step, and generates by division a second job ticket describing a processing parameter of the unprocessed part for the processing step of interest, so as to process the unprocessed part in the processing step of interest, and wherein upon completion of processing the unprocessed part in the processing step of interest, said job ticket generation unit merges the second job ticket with a job ticket based on the first job ticket for the purpose of processing in steps next and subsequent to the processing step of interest, and wherein said job ticket generation unit describes a password in the job ticket based on the first job ticket and the second job ticket, and determines on the basis of the password whether merge processing is possible when merging the job tickets.

2. The apparatus according to claim 1, wherein the job ticket division condition includes information representing an event in which the processing status of the processing step of interest detected by said detection unit interrupts processing in the processing step of interest.

3. The apparatus according to claim 1, wherein the event which leaves an unprocessed part includes generation of an odd part less than a processing unit in a step next to the processing step of interest.

4. The apparatus according to claim 1, wherein when merging the job tickets, said job ticket generation unit determines whether processing parts by the job tickets to be merged are consecutive in the step next to the processing step of interest in which a job ticket is divided, and when the processing parts are consecutive, merges the job tickets.

5. An information processing apparatus which manages workflow information that defines a processing sequence of processing steps and information on each device that executes each processing step, and generates a job ticket for executing a print job in accordance with the workflow information, comprising:

a reception unit adapted to receive a processing status of a processing step of interest among the processing steps from a device which executes processing pertaining to the processing step of interest;

an identification unit adapted to identify a processed part of the print job and an unprocessed part of the print job on the basis of the processing status, when the processing status of the processing step of interest received by the reception unit satisfies a job ticket dividing condition;

a job ticket generation unit adapted to generate a first job ticket describing a processing parameter of the processed part for a next step, in order to process the processed part identified by the identification unit in the next step; and a delivery unit adapted to deliver the first job ticket generated by the job ticket generation unit to a device which executes processing in the next step, wherein when an event which leaves an unprocessed part occurs in the processing step of interest, said job ticket generation unit generates by division the first job ticket describing a processing parameter for the next step, on the basis of the processing status of the processing step of interest so as to advance the processed part to the next step, and generates by division a second job ticket describing a processing parameter of the unprocessed part for the processing step of interest, so as to process the unprocessed part in the processing step of interest, wherein upon completion of processing the unprocessed part in the processing step of interest, said job ticket generation unit merges the second job ticket with a job ticket based on the first job ticket for the purpose of processing in steps next and subsequent to the processing step of interest, and wherein said job ticket generation unit describes a password in the job ticket based on the first job ticket and the second job ticket, and determines on the basis of the password whether merge processing is possible when merging the job tickets.

6. The apparatus according to claim 5, wherein the job ticket division condition includes information representing an event in which the processing status of the processing step of interest received by said reception unit interrupts processing in the processing step of interest.

7. The apparatus according to claim 5, wherein the event which leaves an unprocessed part includes generation of an odd part less than a processing unit in a step next to the processing step of interest.

8. The apparatus according to claim 5, wherein when merging the job tickets, said job ticket generation unit determines whether processing parts by the job tickets to be merged are consecutive in the step next to the processing step of interest in which a job ticket is divided, and when the processing parts are consecutive, merges the job tickets.

9. An information processing method of managing workflow information defining a processing order of processing steps and information on a device to execute each processing step, and generating a job ticket for executing a print job in accordance with the workflow information, comprising:

a reception step of receiving a processing status of a processing step of interest among the processing steps from a device which executes processing pertaining to the processing step of interest;

an identification step of identifying a processed part of the print job and an unprocessed part of the print job on the basis of the processing status, when the processing status of the processing step of interest received in the reception step satisfies a job ticket dividing condition;

a job ticket generation step of generating a first job ticket describing a processing parameter of the processed part for a next step, in order to process the processed part identified in the identification step in the next step; and a delivery step of delivering the first job ticket generated in the job ticket generation step to a device which executes processing in the next step, wherein in the job ticket generation step, when an event which leaves an unprocessed part occurs in the processing step of interest, the first job ticket describing a processing parameter for the next step is generated by division on the basis of the processing status of the processing step of interest so as to advance the processed part to the next step, and a second job ticket describing a processing parameter of the unprocessed part for the processing step of interest is generated by division so as to process the unprocessed part in the processing step of interest, wherein in the job ticket generation step, upon completion of processing the unprocessed part in the processing step of interest, the second job ticket is merged with a job ticket based on the first job ticket for the purpose of processing in steps next and subsequent to the processing step of interest, and wherein in the job ticket generation step, a password is described in the job ticket based on the first job ticket and the second job ticket, and whether merge processing is possible is determined on the basis of the password when merging the job tickets.

10. The method according to claim 9, wherein the job ticket division condition includes information representing an event in which the processing status of the processing step of interest received in the reception step interrupts processing in the processing step of interest.

11. The method according to claim 9, wherein the event which leaves an unprocessed part includes generation of an odd part less than a processing unit in a step next to the processing step of interest.

12. The method according to claim 9, wherein in the job ticket generation step, when merging the job tickets, whether processing parts by the job tickets to be merged are consecutive in the step next to the processing step of interest in which a job ticket is divided is determined, and when the processing parts are consecutive, the job tickets are merged.

13. A job processing method of executing a processing step on the basis of a job ticket defining processing parameters and a processing order of processing steps, comprising:

a reception step of receiving the job ticket;

a recognition step of recognizing a processing content of a processing step of interest that is defined in the job ticket received in the reception step and is to be executed by a job processing apparatus;

a detection step of detecting a processing status of the process recognized in the recognition step; an identification step of identifying a processed part of a print job and an unprocessed part of the print job on the basis of the processing status, when the processing status detected in the detection step satisfies a job ticket dividing condition;

a job ticket generation step of generating a first job ticket that describes a processing parameter of the processed part for a next step, in order to process the processed part in the next step that has been identified in the identification step; and a delivery step of delivering the first job ticket generated in the job ticket generation step to a device which executes processing in the next step, wherein in the job ticket generation step, when an event which leaves an unprocessed part occurs in the processing step of interest, the first job ticket describing a processing parameter for the next step is generated by division on the basis of the processing status of the processing step of interest so as to advance the processed part to the next step, and a second job ticket describing a processing parameter of the unprocessed part for the processing step of interest is generated by division so as to process the unprocessed part in the processing step of interest, wherein in the job ticket generation step, upon completion of processing the unprocessed part in the processing step of interest, the second job ticket is merged with a job ticket based on the first job ticket for the purpose of processing in steps next and subsequent to the processing step of interest, and wherein in the job ticket generation step, a password is described in the job ticket based on the first job ticket and the second job ticket, and whether merge processing is possible is determined on the basis of the password when merging the job tickets.

14. The method according to claim 13, wherein the job ticket division condition includes information representing an event in which the processing status of the processing step of interest detected in the detection step interrupts processing in the processing step of interest.

15. The method according to claim 13, wherein the event which leaves an unprocessed part includes generation of an odd part less than a processing unit in a step next to the processing step of interest.

16. The method according to claim 13, wherein in the job ticket generation step, when merging the job tickets, whether processing parts by the job tickets to be merged are consecutive in the step next to the processing step of interest in which a job ticket is divided is determined, and when the processing parts are consecutive, the job tickets are merged.

17. A non-transitory computer-readable recording medium which records a computer program for executing a method of managing workflow information defining a processing order of processing steps and information on a device to execute each processing step, and generating a job ticket for executing a print job in accordance with the workflow information, the method comprising:

a reception step of receiving a processing status of a processing step of interest among the processing steps from a device which executes processing pertaining to the processing step of interest;

an identification step of identifying a processed part of the print job and an unprocessed part of the print job on the basis of the processing status, when the processing status of the processing step of interest received in the reception step satisfies a job ticket dividing condition;

a job ticket generation step of generating a first job ticket describing a processing parameter of the processed part for a next step, in order to process the processed part identified in the identification step in the next step; and a delivery step of delivering the first job ticket generated in the job ticket generation step to a device which executes processing in the next step, wherein in the job ticket generation step, when an event which leaves an unprocessed part occurs in the processing step of interest, the first job ticket describing a processing parameter for the next step is generated by division on the basis of the processing status of the processing step of interest so as to advance the processed part to the next step, and a second job ticket describing a processing parameter of the unprocessed part for the processing step of interest is generated by division so as to process the unprocessed part in the processing step of interest, wherein in the job ticket generation step, upon completion of processing the unprocessed part in the processing step of interest, the second job ticket is merged with a job ticket based on the first job ticket for the purpose of processing in steps next and subsequent to the processing step of interest, and wherein in the job ticket generation step, a password is described in the job ticket based on the first job ticket and the second job ticket, and whether merge processing is possible is determined on the basis of the password when merging the job tickets.

18. The medium according to claim 17, wherein the job ticket division condition includes information representing an event in which the processing status of the processing step of interest received in the reception step interrupts processing in the processing step of interest.

19. The medium according to claim 17, wherein the event which leaves an unprocessed part includes generation of an odd part less than a processing unit in a step next to the processing step of interest.

20. The medium according to claim 17, wherein in the job ticket generation step, when merging the job tickets, whether processing parts by the job tickets to be merged are consecutive in the step next to the processing step of interest in which a job ticket is divided is determined, and when the processing parts are consecutive, the job tickets are merged.

21. A non-transitory computer-readable recording medium which records a computer program for executing an information processing method of executing a processing step on the basis of a job ticket defining processing parameters and a processing order of processing steps, the method comprising:

a reception step of receiving the job ticket;

a recognition step of recognizing a processing content of a processing step of interest that is defined in the job ticket received in the reception step and is to be executed by the job processing apparatus;

a detection step of detecting a processing status of the process recognized in the recognition step; an identification step of identifying a processed part of a print job and an unprocessed part of the print job on the basis of the processing status, when the processing status detected in the detection step satisfies a job ticket dividing condition;

a job ticket generation step of generating a first job ticket that describes a processing parameter of the processed part for a next step, in order to process the processed part in the next step that has been identified in the identification step; and a delivery step of delivering the first job ticket generated in the job ticket generation step to a device which executes processing in the next step, wherein in the job ticket generation step, when an event which leaves an unprocessed part occurs in the processing step of interest, the first job ticket describing a processing parameter for the next step is generated by division on the basis of the processing status of the processing step of interest so as to advance the processed part to the next step, and a second job ticket describing a processing parameter of the unprocessed part for the processing step of interest is generated by division so as to process the unprocessed part in the processing step of interest, wherein in the job ticket generation step, upon completion of processing the unprocessed part in the processing step of interest, the second job ticket is merged with a job ticket based on the first job ticket for the purpose of processing in steps next and subsequent to the processing step of interest, and wherein in the job ticket generation step, a password is described in the job ticket based on the first job ticket and the second job ticket, and whether merge processing is possible is determined on the basis of the password when merging the job tickets.

22. The medium according to claim 21, wherein the job ticket division condition includes information representing an event in which the processing status of the processing step of interest detected in the detection step interrupts processing in the processing step of interest.

23. The medium according to claim 21, wherein the event which leaves an unprocessed part includes generation of an odd part less than a processing unit in a step next to the processing step of interest.

24. The medium according to claim 21, wherein in the job ticket generation step, when merging the job tickets, whether processing parts by the job tickets to be merged are consecutive in the step next to the processing step of interest in which a job ticket is divided is determined, and when the processing parts are consecutive, the job tickets are merged.

* * * * *